United States Patent [19]
Izumi et al.

[11] Patent Number: 5,962,156
[45] Date of Patent: *Oct. 5, 1999

[54] NICKEL-METAL HYDRIDE STORAGE BATTERY AND ALLOY FOR CONFIGURING NEGATIVE ELECTRODE OF THE SAME

[75] Inventors: Yoichi Izumi, Habikino; Yoshio Moriwaki, Hirakata; Katsumi Yamashita, Fujisawa; Takashi Tokuhiro, Kamakura, all of Japan

[73] Assignee: Matsushita Electric Industrial Co., Ltd., Osaka-fu, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/801,340

[22] Filed: Feb. 19, 1997

[30] Foreign Application Priority Data

Feb. 20, 1996 [JP] Japan ............................. 8-031561
Apr. 15, 1996 [JP] Japan ............................. 8-092368

[51] Int. Cl.$^6$ ............................. H01M 10/30; H01M 4/38
[52] U.S. Cl. ............................. 429/59; 429/101; 429/223; 429/224; 420/900; 420/582; 420/584; 420/587; 420/588; 148/442; 204/293
[58] Field of Search ............................. 429/59, 101, 228, 429/223, 224; 204/293; 420/900, 582, 584.1, 587, 588; 148/419, 442

[56] References Cited

U.S. PATENT DOCUMENTS 4,946,646  8/1990  Gamo et al. .
5,468,309  11/1995  Seri et al. .

FOREIGN PATENT DOCUMENTS 0 450 590 A1  10/1991  European Pat. Off. .
621647        10/1994  European Pat. Off. .
0 739 990 A1  10/1996  European Pat. Off. .
791971        10/1997  European Pat. Off. .
63-284758     11/1988  Japan .
1-102855      4/1989   Japan .
2-065060      3/1990   Japan .
8-236111      9/1996   Japan .

Primary Examiner—Sikyin Ip
Attorney, Agent, or Firm—Akin, Gump, Strauss, Hauer & Feld, L.L.P.

[57] ABSTRACT

A nickel-metal hydride storage battery having a high capacity and excellent cycle life is disclosed. The battery employs, as its material for the negative electrode, a hydrogen storage alloy powder having a composition represented by the general formula $Zr_{1-x}M3_xMn_aMo_bCr_cM1_dM2_eNi_f$, where M1 represents at least one element selected from the group consisting of V, Nb and rare earth elements, M2 represents at least one element selected from the group consisting of Fe, Co and Cu, and M3 represents at least one element selected from the group consisting of Ti and Hf, and where $0 \leq x \leq 0.3$, $0.3 \leq a \leq 0.7$, $0.01 \leq b \leq 0.2$, $0.05 \leq c \leq 0.3$, $0 \leq d \leq 0.1$, $0 \leq e \leq 0.2$, $0.8 \leq f \leq 1.3$, and $1.6 \leq a+b+c+d+e+f \leq 2.2$, and wherein said hydrogen storage alloy has at least one of a Laves phase having a crystal structure of the $MgCu_2$-type (C15) and a Laves phase having a crystal structure of the $MgZn_2$-type (C14), and wherein a sum of integrated intensities of diffraction peaks other than those attributed to the presence of said Laves phase is not more than 5% of a sum of integrated intensities of all diffraction peaks in a diffraction angle $2\theta$ of 10° to 80° in a powder X-ray diffraction pattern by Cu K$\alpha$ radiation.

19 Claims, 17 Drawing Sheets

NICKEL-METAL HYDRIDE STORAGE BATTERY AND ALLOY FOR CONFIGURING NEGATIVE ELECTRODE OF THE SAME

BACKGROUND OF THE INVENTION

The present invention relates to a nickel-metal hydride storage battery configured with an electrode comprising a hydrogen storage alloy capable of electrochemically absorbing and desorbing hydrogen as an active material in a reversible manner and a hydrogen storage alloy for the same.

Alkaline storage batteries having a wide application in various portable appliances include nickel-cadmium storage batteries, nickel-metal hydride storage batteries and the like. Among them, the nickel-metal hydride storage batteries have recently been used widely as small-size sealed storage batteries, because they can be expected to have a higher capacity density.

For the hydrogen storage alloys which play an important role in these nickel-metal hydride storage batteries, there is a proposal of using alloys having a high capacity obtained by improving the $ZrMn_2$ alloy system as disclosed in the specification of U.S. Pat. No. 4,946,646, Japanese Laid-Open Pat. Publication Sho 63-284758, Japanese Laid-Open Pat. Publication Hei 1102855, and the like.

However, these prior art hydrogen storage alloys remain to be improved more with respect to their capacity, their cycle life and the like before their application for configuring batteries. That is, in addition to the main alloy phase, the prior art hydrogen storage alloys contain such minor phases as segregated phase and impurity phase that do not function as an effective phase in the hydrogen storage alloy and cause a lowering of the capacity of the alloy. In general, the more homogeneous the metal material, the more excellent the material becomes with respect to its corrosion-resistant property. The prior art hydrogen storage alloys contain minute segregated or impurity phases and are not homogeneous microscopically, and thus have an insufficient corrosion-resistant property for an alkaline electrolyte. Such component of the alloy that is liable to be dissolved, for instance, Mn or the like in particular, selectively dissolves in the alkaline electrolyte, and leads to a decrease in capacity of the alloy and eventually a lowering of the cycle life of the battery configured with the alloy.

BRIEF SUMMARY OF THE INVENTION

In view of the above-mentioned problems involved in the prior art $ZrMn_2$ system alloys, the present inventors made a search and research, and obtained an alloy having excellent characteristics ultimately. The alloy has high homogeneity and carries less impurity phase. Moreover, improved corrosion resistance of the alloy is effective to selectively prevent alloy components, such as Mn, for instance, which readily dissolve, from dissolving into an alkaline electrolyte.

The primary object of the present invention is to provide a high capacity nickel-metal hydride storage battery having a longer cycle life.

Other objects of the present invention are to improve low-temperature/high rate discharging efficiency which is necessary in the actual service of the battery configured with the hydrogen storage alloy of the $AB_2$ type consisting mainly of the Laves phase, and to provide a hydrogen storage alloy for a battery which can realize a higher capacity of the battery under diversified service conditions.

The nickel-metal hydride storage battery in accordance with the present invention uses, as a hydrogen storage alloy powder for configuring the negative electrode, an alloy of an intermetallic compound having a composition represented by the below-mentioned general formula (1), wherein the main alloy phase belongs to a Laves phase having a crystal structure of the $MgCu_2$-type (C15) and/or a Laves phase having a crystal structure of the $Mgzn_2$-type (C14), and wherein a sum of integrated intensities of diffraction peaks other than those attributed to the presence of the Laves phase is not more than 5% of a sum of integrated intensities of all diffraction peaks in a diffraction angle 2θ of 10° to 80° in a powder X-ray diffraction pattern by Cu Kα radiation.

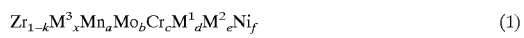

$$Zr_{1-k}M^3_x Mn_a Mo_b Cr_c M^1_d M^2_e Ni_f \qquad (1)$$

where, $M^1$ represents at least one element selected from the group consisting of V, Nb and rare earth elements, $M^2$ represents at least one element selected from the group consisting of Fe, Co and Cu, and $M^3$ represents at least one element selected from the group consisting of Ti and Hf, and where $0 \leq x \leq 0.3$, $0.3 \leq a \leq 0.7$, $0.01 \leq b \leq 0.2$, $0.05 \leq c \leq 0.3$, $0 \leq d \leq 0.1$, $0 \leq e \leq 0.2$, $0.8 \leq f \leq 1.3$, and $1.6 \leq a+b+c+d+e+f \leq 2.2$.

In the above-mentioned alloy, it is preferable that the proportion of the Hf content to a sum of the Hf content and the Zr content is 0.003 to 0.1 by atomic ratio.

The present invention also provides a nickel-metal hydride storage battery which employs a hydrogen storage alloy represented by the below-mentioned general formula (2), namely a preferable alloy represented by the general formula (1) wherein Ti is selected as M3.

$$Zr_{1-x}Ti_x Mn_a Mo_b Cr_c V_d Co_e Ni_f \qquad (2)$$

where $0.15 \leq x \leq 0.25$, $0.4 \leq a \leq 0.6$, $0.01 \leq b \leq 0.2$, $0.15 \leq c \leq 0.25$, $0 \leq d \leq 0.1$, $0 \leq e \leq 0.2$, $1 \leq f \leq 1.3$, and $1.6 \leq (a+b+c+d+e+f) \leq 2$.

Further, the present invention also provides a nickel-metal hydride storage battery which employs a hydrogen storage alloy represented by the below-mentioned general formula (3), namely a preferable hydrogen storage alloy represented by the general formula (1), wherein M3 is omitted and x=0.

$$ZrMn_a Mo_b Cr_c M^1_d M^2_e Ni_f \qquad (3)$$

where, $M^1$ represents at least one element selected from the group consisting of V, Nb and rare earth elements, and $M^2$ represents at least one element selected from the group consisting of Fe, Co and Cu, and where $0.4 \leq a \leq 0.7$, $0.1 \leq b \leq 0.2$, $0.1 \leq c \leq 0.3$, $0 \leq d \leq 0.1$, $0 \leq e \leq 0.2$, $1.0 \leq f \leq 1.3$, and $1.8 \leq a+b+c+d+e+f \leq 2.2$.

Similar to the alloy represented by the general formula (1), the alloys represented by the general formulae (2) and (3) are also an intermetallic compound and have as a main alloy phase the Laves phase having a crystal structure of the $MgCu_2$-type (C15) and/or the Laves phase having a crystal structure of the $MgZn_2$-type (C14), and wherein a sum of integrated intensities of diffraction peaks other than those attributed to the presence of the Laves phase (hereafter abbreviated to "the diffraction peaks due to the non-Laves phase") is not more than 5% of a sum of integrated intensities of all diffraction peaks in a diffraction angle 2θ of 10° to 80° in a powder X-ray diffraction pattern by Cu Kα radiation.

In a preferred mode of the present invention, the hydrogen storage alloy powder has been subjected to a treatment which includes immersing the hydrogen storage alloy powder in an alkaline aqueous solution containing at least lithium hydroxide and having a specific gravity of not less than 1.2, and has a specific surface area of not less than 2 m²/g.

In another aspect of the present invention, the hydrogen storage alloy powder has been subjected to a treatment which includes immersing the hydrogen storage alloy powder in an alkaline aqueous solution containing at least lithium hydroxide and having a specific gravity of not less than 1.2, and has a magnetized value of not less than 0.5 emu/g and not more than 5 emu/g at 25° C. in a magnetic field of 10 k Oe.

In still an other preferred mode of the present invention, the hydrogen storage alloy powder has been subjected to a homogenizing treatment comprising exposure to 800° C. to 1200° C. in a vacuum or an inert gas atmosphere.

While the novel features of the invention are set forth particularly in the appended claims, the invention, both as to organization and content, will be better understood and appreciated, along with other objects and features thereof, from the following detailed description taken in conjunction with the drawings.

DETAILED DESCRIPTION OF THE INVENTION

Figure 1:
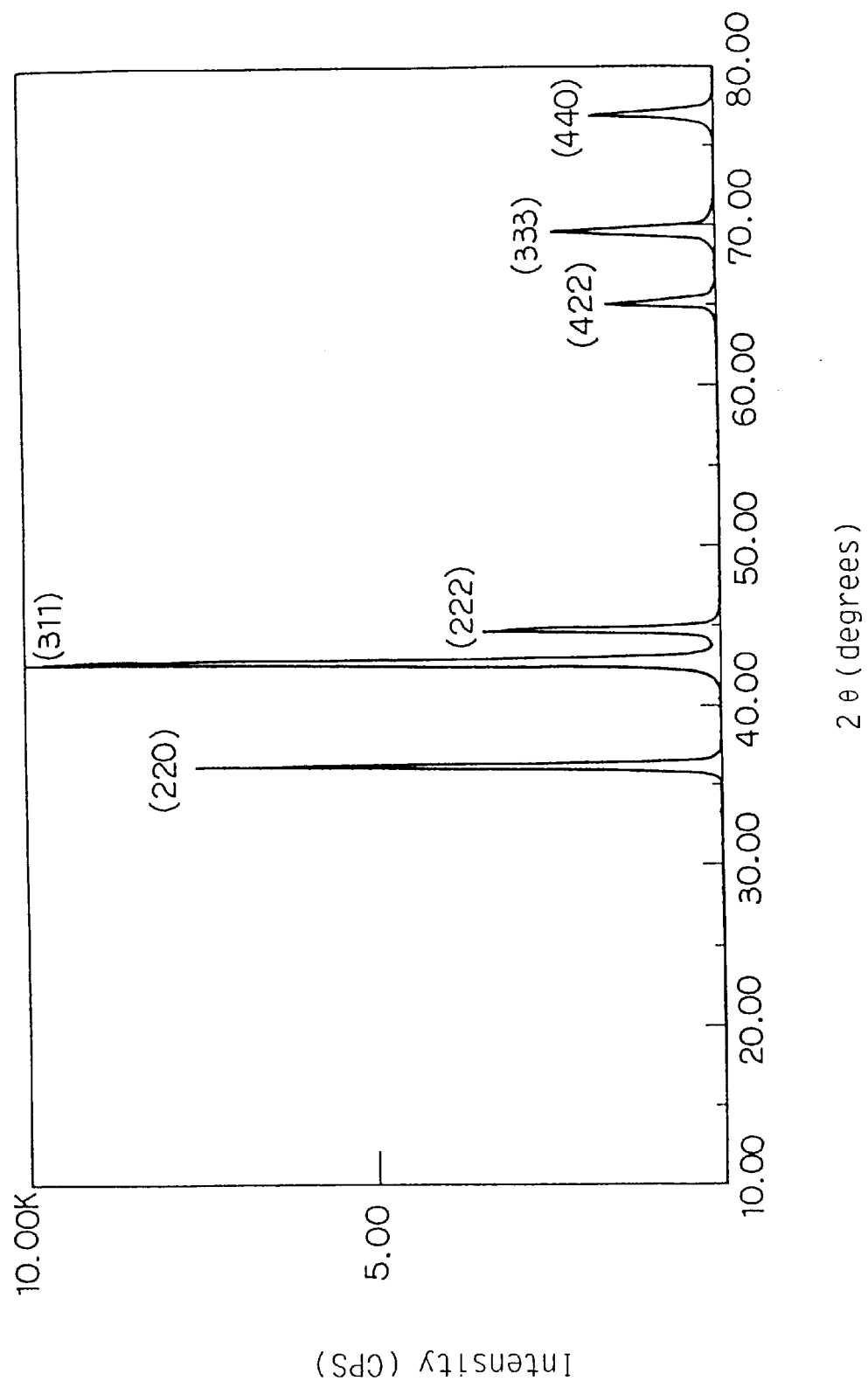
FIG. 1 illustrates a standard powder X-ray diffraction pattern of a hydrogen storage alloy having a Laves phase of C15 in accordance with the present invention.

As described previously, the present invention defines the physical properties of the hydrogen storage alloy powder included in the negative electrode of the storage battery. Although details of the functioning mechanism of the alloy is not fully clarified, the present invention has realized a highly corrosion-resistant alloy by defining appropriate component ratios of the hydrogen storage alloy and providing the alloy with high homogeneity.

As the hydrogen storage alloy powder included in the nickel-metal hydride storage battery in accordance with the present invention, an alloy powder represented by any of the above-mentioned general formulae (1), (2), and (3) undergoing the below-mentioned treatment is preferable. An alloy powder with a mean diameter of 200 μm or less is immersed in an alkaline solution containing at least lithium hydroxide and having a specific gravity of not less than 1.2, at a temperature of not less than 60° C. for one hour or more.

By this treatment, any of such elements that exists on the surface of the alloy powder which are liable to be dissolved is dissolved out. By configuring a battery with the treated powder, it is possible to decrease the amount of the material dissolving from the alloy and the negative electrode in the battery to an extremely low level. Therefore, it is possible to make the deterioration in the capacity of the battery with the charge/discharge cycle small. In addition, it is desirable that preferably a saturated amount of a cobalt compound is dissolved in the alkaline aqueous solution, which is used in the above-mentioned treatment.

For realizing the higher capacity of the batteries even under their diversified service conditions, it is important to fulfill the following two requirements at the same time.

(1) Structure of the Hydrogen Storage Alloy

In order to improve the discharge characteristic of the hydrogen storage alloy as a negative electrode, it is important to increase the proportion of the Laves phase as its effective alloy phase by preventing the formation of segregated phases in the alloy as much as possible and to make the crystal as small as possible.

In the prior art hydrogen storage alloy of the $AB_2$ type having the Laves phase as its main phase, a segregated phase consisting mainly of Zr and Ni is formed in its solidifying process and the formed segregated phase adversely affects the discharge characteristic.

The hydrogen storage alloy in accordance with the present invention has a sum of integrated intensities of diffraction peaks attributed to the presence of other phases than the Laves phase such as segregated phases is not more than 5% of a sum of integrated intensities of all diffraction peaks in a diffraction angle $2\theta$ of 10° to 80° in a powder X-ray diffraction pattern by Cu $K\alpha$ radiation. Therefore, it does not have the segregated phase or, even if it has some, the segregated phase is very small, and it is possible to reduce the adverse effect on the discharge characteristic greatly.

Figure 2:
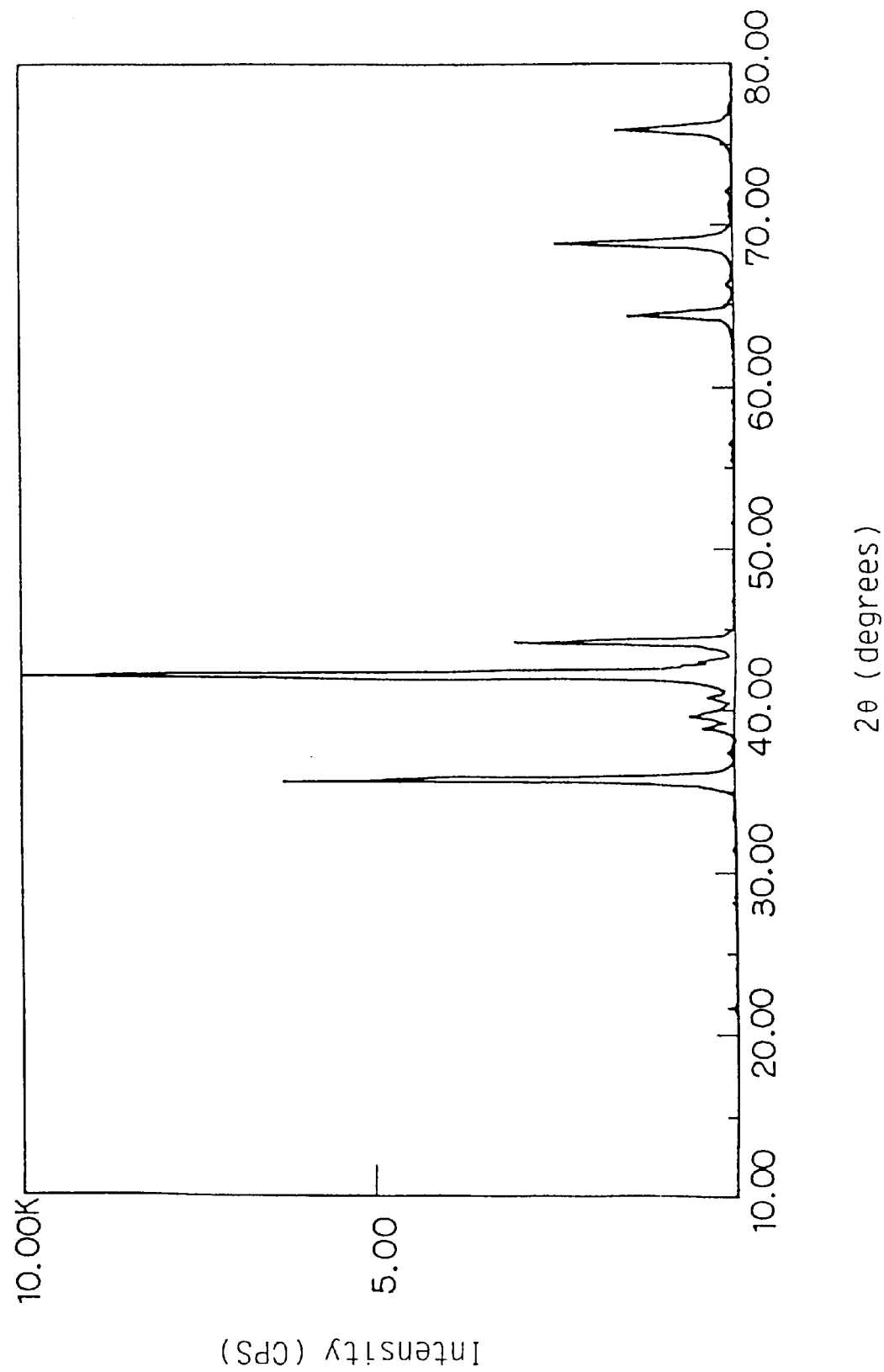
FIG. 2 illustrates a powder X-ray diffraction pattern of another hydrogen storage alloy in accordance with the present invention, wherein the sum of the integrated intensities of the diffraction peaks due to the non-Laves phase is about 3% of the sum of the integrated intensities of all diffraction peaks in a range of diffraction angle 2θ of 10° to 80°.

FIG. 1 shows a standard powder X-ray diffraction pattern of the hydrogen storage alloy in accordance with the present invention represented by the aforementioned general formula (1) that has a Laves phase having a crystal structure of the $MgCu_2$-type (C15). As clearly seen from the figure, diffraction peaks due to the non-Laves phase are not present in a range of diffraction angle $2\theta$ of 10° to 80°. In FIG. 2, although diffraction peaks due to the non-Laves phase are observed slightly, the sum of the integrated intensities of these peaks is about 3% of the sum of the integrated intensities of all diffraction peaks in a range of diffraction angle $2\theta$ of 10° to 80°.

Figure 3:
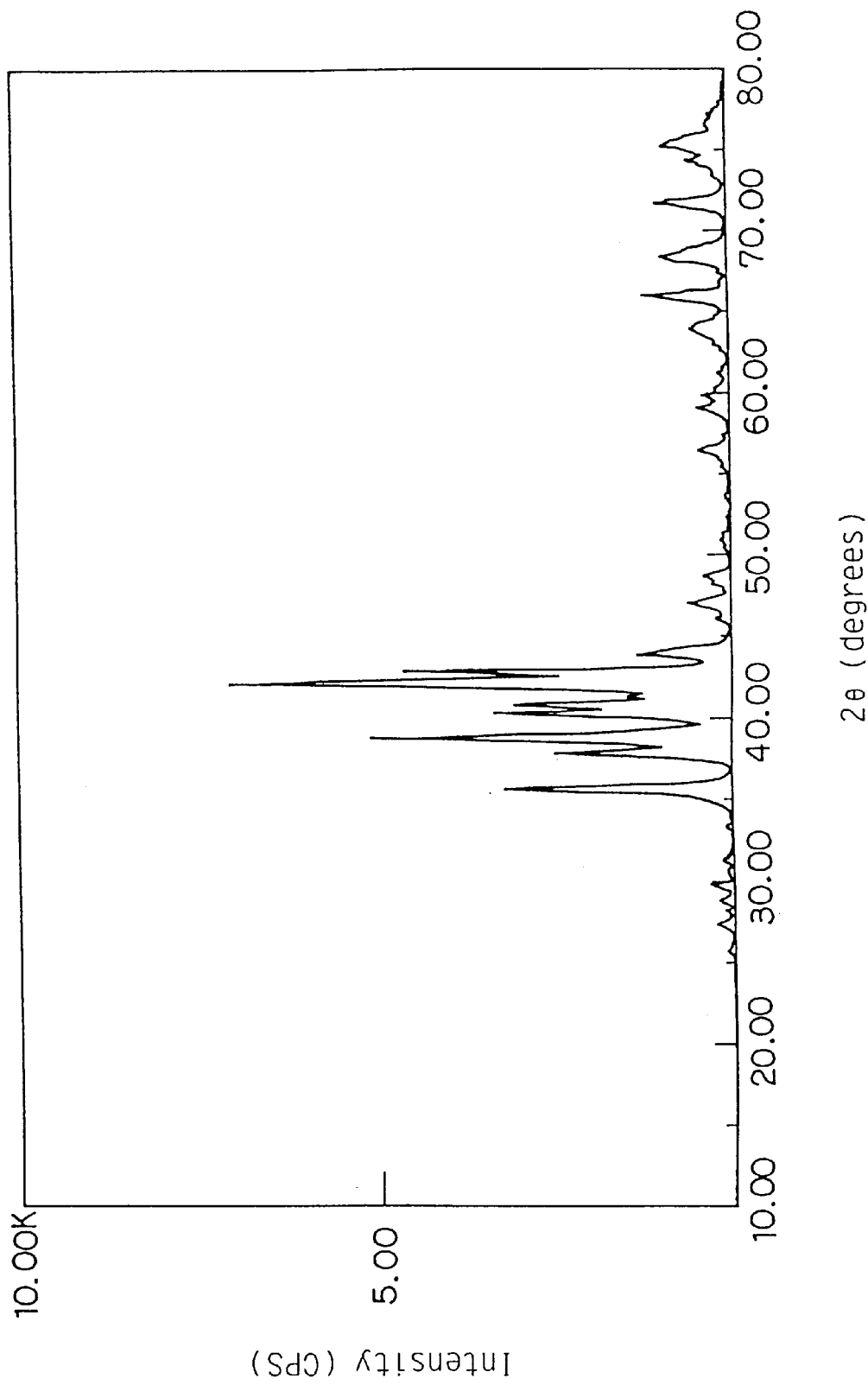
FIG. 3 illustrates a powder X-ray diffraction pattern of a hydrogen storage alloy, wherein the sum of the integrated intensities of the diffraction peaks due to the non-Laves phase is 30% of the sum of the integrated intensities of all diffraction peaks in a range of diffraction angle 2θ of 10° to 80°.

Whereas, in FIG. 3, the sum of the integrated intensities of diffraction peaks due to the non-Laves phase in X-ray diffraction pattern is about 30% of the sum of the integrated intensities of all diffraction peaks in a range of diffraction angle $2\theta$ of 10° to 80°. The alloy with such diffraction pattern carries many segregated phases that have adverse effects on the discharge performance.

In the alloys in accordance with the present invention, there exist such alloys stably that have a Laves phase having a crystal structure of the $MgCu_2$-type (C15) or a Laves phase having a crystal structure of the $MgZn_2$-type (C14) as a main phase. Although it depends on the alloy composition, most alloys samples have both types of Laves phase.

Figure 4:
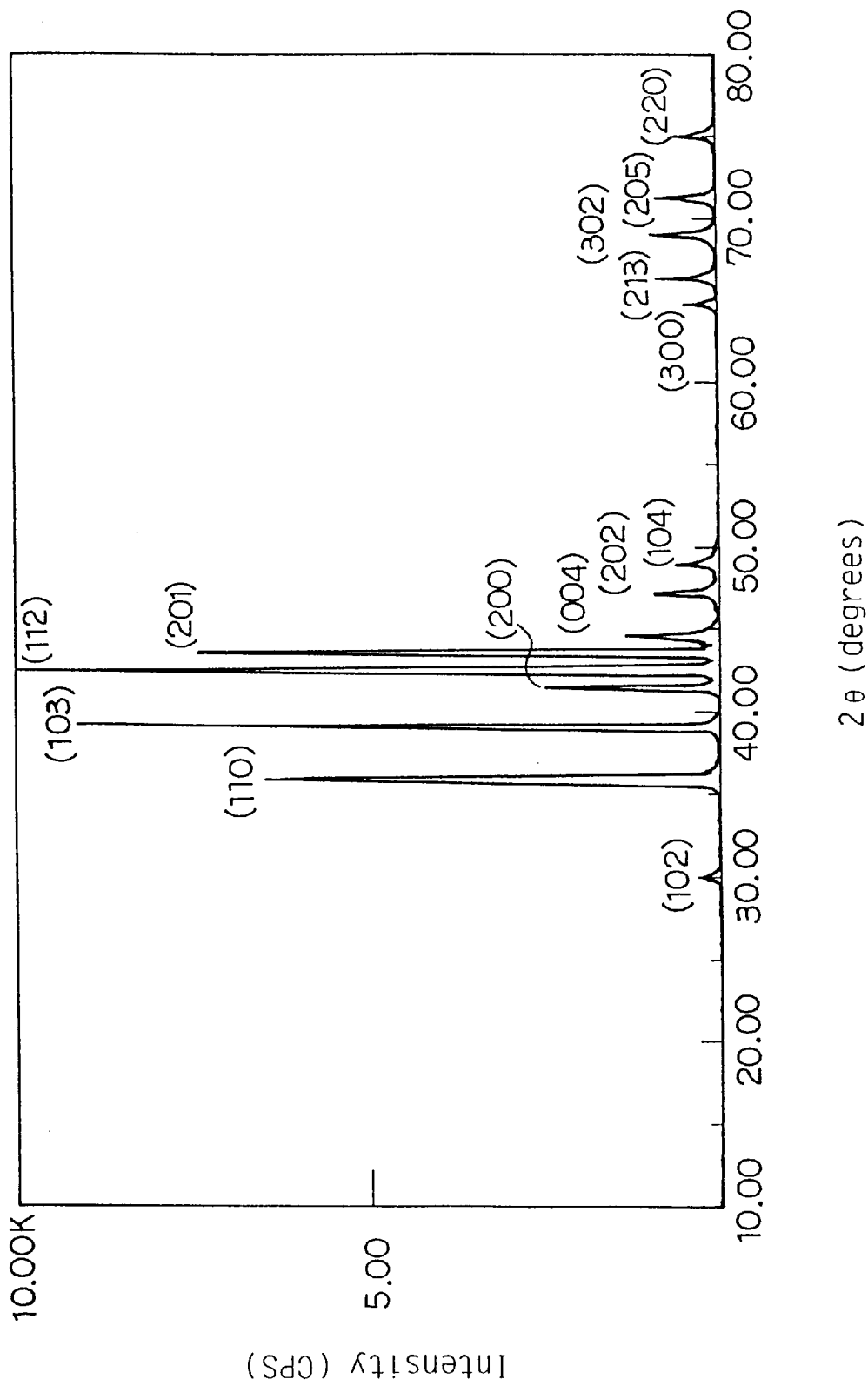
FIG. 4 illustrates a standard powder X-ray diffraction pattern of a further hydrogen storage alloy having a Laves phase of C14 in accordance with the present invention.
Figure 5:
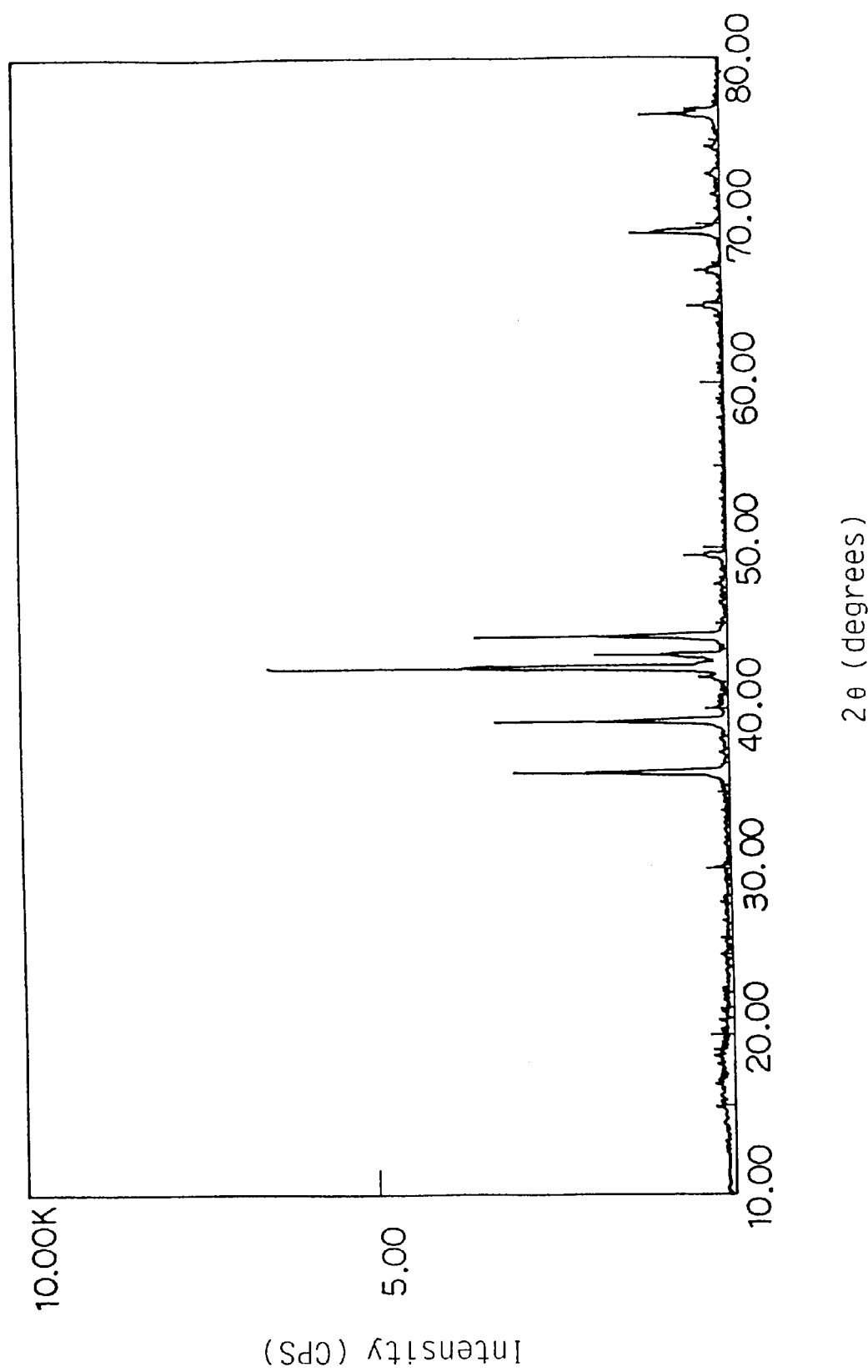
FIG. 5 illustrates a powder X-ray diffraction pattern of another hydrogen storage alloy having a Laves phase of C14 and C15 in accordance with the present invention.

FIG. 4 shows a standard powder X-ray diffraction pattern of an alloy that has the Laves phase having the crystal structure of the $MgZn_2$-type (C14) in accordance with the present invention. Whereas, FIG. 5 shows a standard powder X-ray diffraction pattern of a representative alloy that has both types of Laves phase of C14 and C15 in accordance with the present invention.

The alloys having the Laves phase of C14 or C15, or both types of Laves phase of C14 and C15 can give an exceptional discharge characteristic if they have a sum of integrated intensities of diffraction peaks due to the non-Laves phase of not more than 5% of the sum of integrated intensities of all diffraction peaks.

(2) Composition of the Hydrogen Storage Alloy

Previously known hydrogen storage alloys of $AB_2$ type for electrodes have a very wide composition range. However, the composition represented by any of the above-mentioned general formulae (1) to (3) is appropriate to realize an alloy that shows exceptional discharge performance while maintaining a high hydrogen storage ability.

Unless both of the conditions defined in the above-mentioned (1) and (2) are fulfilled at the same time, it is difficult to realize an excellent discharge characteristic equivalent to or more than that held by the prior art $AB_2$ type alloys.

In a manufacturing process, it is possible to increase the hydrogen storage ability of the alloy and to make the discharge characteristic of a battery configured with the alloy preferable, by performing, after the preparation of the alloy, a homogenizing treatment on the alloy at a temperature of 800° C. to 1200° C. in a vacuum or an inert gas atmosphere. In addition, it is also preferable from the viewpoint of the manufacturing process of the alloy itself to finish the alloy powder to a sphere or a mass having a diameter of not more than 200 $\mu$m, or a thin flake or thin band having a thickness of not more than 500 $\mu$m, by subjecting the molten alloy to an ultra-rapid cooling-solidifying process such as gas atomizing process or the like.

In the following paragraphs, the present invention will be described in more detail by way of some specific examples with reference to the attached drawings.

EXAMPLE 1

A hydrogen storage alloy represented by the formula $Zr_{0.8}Ti_{0.2}Mn_{0.6}Mo_{0.1}Cr_{0.2}Co_{0.1}Ni_{1.15}$ was selected and the alloy was finished to a powder by the gas atomizing process. The amount of one batch was 500 g.

In preparing the hydrogen storage alloy, commercially available products each having a purity of not less than 99.9% were used as the metal raw materials for constituting the alloy. After thermal homogenizing treatment of the obtained alloy in a vacuum at 1000° C. for 6 hours, the alloy powder was sieved to an average particle diameter of about 45 $\mu$m.

The alloy powder thus obtained was then immersed and boiled in a treating solution prepared by dissolving a saturated amount of cobalt hydroxide in a potassium hydroxide aqueous solution containing lithium hydroxide monohydrate at 40 g/L and having a specific gravity of 1.31. During this treatment, the temperature of the solution was kept at about 110° C. and the treatment lasted for 6 hours. Thereafter, the alloy powder was separated from the treating solution, washed with water and dried for configuring a battery.

The obtained alloy powder was kneaded with water and carboxymethyl cellulose as a binding agent to produce a paste which was then filled in a foamed nickel porous substrate having a porosity of 95%. After the substrate was dried in a vacuum at 90° C. and pressed to a thickness of 0.33 mm, it was cut into a rectangular negative electrode having a width of 39 mm and a length of 97 mm.

As the positive electrode, a known foamed nickel electrode comprising an active material of nickel hydroxide and a Co compound added for improving the utilization was selected and finished to a rectangular shape having a width of 39 mm, a length of 77 mm and a thickness of 0.70 mm which was then provided with a lead plate. As the separator, a polypropylene nonwoven fabric with a hydrophilic property was selected.

By rolling up a combination of the negative electrode, the positive electrode and the separator in a spiral fashion, the rolled up assembly was inserted into a cylindrical battery case of AA size. After injecting 2.2 ml of an electrolyte prepared by dissolving lithium hydroxide at 40 g/L in a potassium hydroxide aqueous solution having a specific gravity of 1.30 in the battery case, its open end was closed and a sealed battery was obtained. This was named battery A in accordance with the present invention.

For comparison, a conventional battery was also configured. A procedure similar to that of the battery A was followed except for the use of a hydrogen storage alloy of the formula $ZrMn_{0.6}V_{0.2}Cr_{0.1}Ni_{1.2}$ prepared by a high frequency induction melting-casting process with mechanical crushing and sieving but lacking any immersion in the treatment solution. This was named conventional battery B.

The capacity of both batteries A and B at 5-hour discharge rate was about 1200 mAh.

Figure 6:
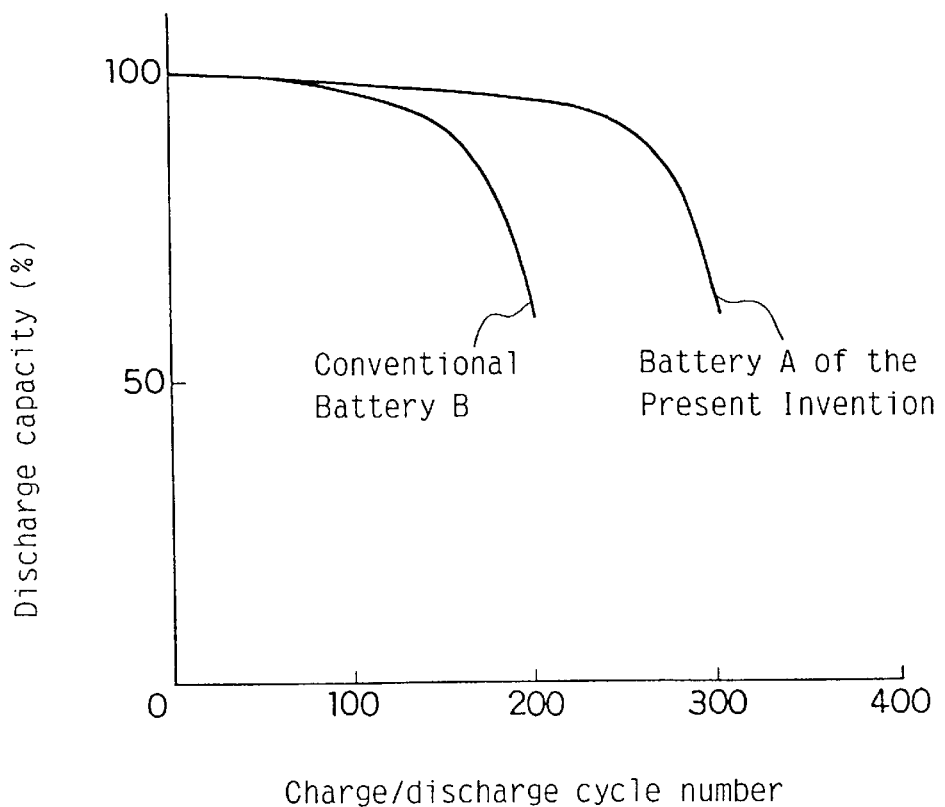
FIG. 6 is a cycle life characteristic diagram showing variances in the discharge capacity with the charge/discharge cycle of the battery A of the present invention and the conventional battery B.

The batteries A and B were evaluated by a charge/discharge cycle test. The charging was continued at 5-hour rate for 6 hours, and the discharging was continued at 1-hour rate until the terminal voltage dropped to 1.0 V at an ambient temperature of 40° C. The reason for selecting the ambient temperature of 40° C. is that deterioration of the alloy is faster at high temperature than at room temperature in general, and the result of evaluation on the corrosion-resistant property of the alloy can be made more clear at high temperature. A cycle number in the test at which the discharge capacity of the battery dropped to 60% of the initial discharge capacity was regarded as the cycle life of the battery. The result of the evaluation is shown in FIG. 6. The cycle life of the conventional battery B was about 200 cycles whereas that of the battery A of the present invention was about 300 cycles.

After completion of the above-mentioned charge/discharge cycle test, the batteries were disassembled and the hydrogen storage alloy negative electrodes were observed electron microscopically. This revealed that in the conventional battery B, the hydrogen storage alloy powder has rough surfaces, clearly indicating a corrosion of the alloy powder induced by the alkaline electrolyte inside the battery. By contrast, in the battery A of the present invention, the hydrogen storage alloy powder has a relatively satisfactory smooth surface. In other words, substantially no change occurred in the state of the alloy surface before and after the charge/discharge cycle test. From the present analytical results, it was confirmed that the present invention has a preventive effect against deterioration of the alloy powder.

Detailed analysis was conducted to grasp the factor that causes the protective effect against deterioration of the alloy included in the battery of the present invention.

First, each of the hydrogen storage alloy powders was analyzed by powder X-ray diffraction. As a result, it was found that main alloy phase of both alloys was a Laves phase having a crystal structure of the $MgCu_2$-type (C15). In the alloy used in the battery A of the present invention, the intensities of the diffraction peaks attributed to the presence of the Laves phase were high, and observed were only very weak diffraction peaks attributed to the impurity phases. The proportion thereof was very small. That is, the sum of the integrated intensities of the diffraction peaks due to the non-Laves phase was about 5% of the sum of the integrated intensities of the all diffraction peaks. In contrast, in the alloy used in the conventional battery B, diffraction peaks which were considered to be evidently caused by the impurity phases were observed and the sum of the integrated intensities of the diffraction peaks due to the non-Laves phase was about 10% of the sum of the integrated intensities of the all diffraction peaks.

As a result of examinations on the structure of the alloys by scanning electron microscopy and an X-ray microanalyzer, a segregated phase (impurity phase) other than the Laves phase was observed in the alloy of the conventional battery B and the distributions of the elements for constituting the alloy were heterogeneous, whereas the segregated phase (impurity phase) was observed slightly and the distributions of the elements for constituting the alloy were homogeneous in the alloy of the present invention.

Based on these analytical results, it is believed that the structure of the alloy used in the battery A of the present invention is very homogeneous and the alloy has a high corrosion-resistant property. When the alloy is used for configuring a nickel-metal hydride storage battery, it demonstrates an excellent charge/discharge cycle characteristic.

The alloy powder used in the battery A of the present invention after its immersion in the treatment solution has a specific surface area of about 9 $m^2/g$ measured in accordance with BET method and demonstrates a magnetized value of about 1 emu/g at 25° C. in a magnetic field of 10 k Oe. In contrast, the alloy powder used in the conventional battery B has a specific surface area of about 0.2 $m^2/g$ measured in accordance with BET method and demonstrates a magnetized value of about 0.1 emu/g at 25° C. in a magnetic field of 10 k Oe.

When elements existing on the surface of an alloy dissolve in an alkaline treatment solution, the surface of the alloy is roughened microscopically and the specific surface area of the alloy increases. Since solubility differs by the elements in a multi-element alloy, such an element that is not liable to be dissolved tends to remain on the surface of the alloy as a metal. The element that is liable to remain is considered to be Ni and Co in the alloy of the present invention. Since these elements are liable to be magnetized, a large magnetized value is observed with the alloy that has been immersed in the alkaline treatment solution.

In this case, the specific surface area and the magnetized value are indicia representing the degree of the surface roughness, and the larger values of the indicia show that the surface is roughened more. The alloy used for configuring the battery A of the present invention has larger values in the indicia than the conventional one, and thus it is presumed that the state of the surface is made to hold only very scarce amounts of elements which are liable to dissolve. It is therefore believed that this is one of the important factor for the longer cycle life.

The value of magnetization depends on the amounts of Ni and Co remaining on the surface of the alloy as the metals but if the value of the magnetization is too large, that is, in the case where the amounts of Ni and Co remaining on the surface of the alloy as the metals are excessively large, a decrease in the capacity of the alloy occurs. The reason for this is that the Ni or Co remaining on the surface of the alloy scarcely absorbs hydrogen. If the value of magnetization is increased to beyond 5 emu/g, the decrease in the capacity of the alloy will become not negligible. By combining these facts, it is concluded that a preferable value of magnetization is not less than 0.5 emu/g and not more than 5 emu/g.

EXAMPLE 2

In the course of investigations, it became evident to the present inventors that it is necessary to optimize not only alloy structure, but also the amount of each component of the alloy in order to increase the effects of the present invention. The details are described below.

In this example, the composition of the alloy was investigated. The procedures similar to those for the battery A of the present invention are followed in the preparative process of the alloy, the process for configuring the battery and the method for evaluation.

Figure 7:
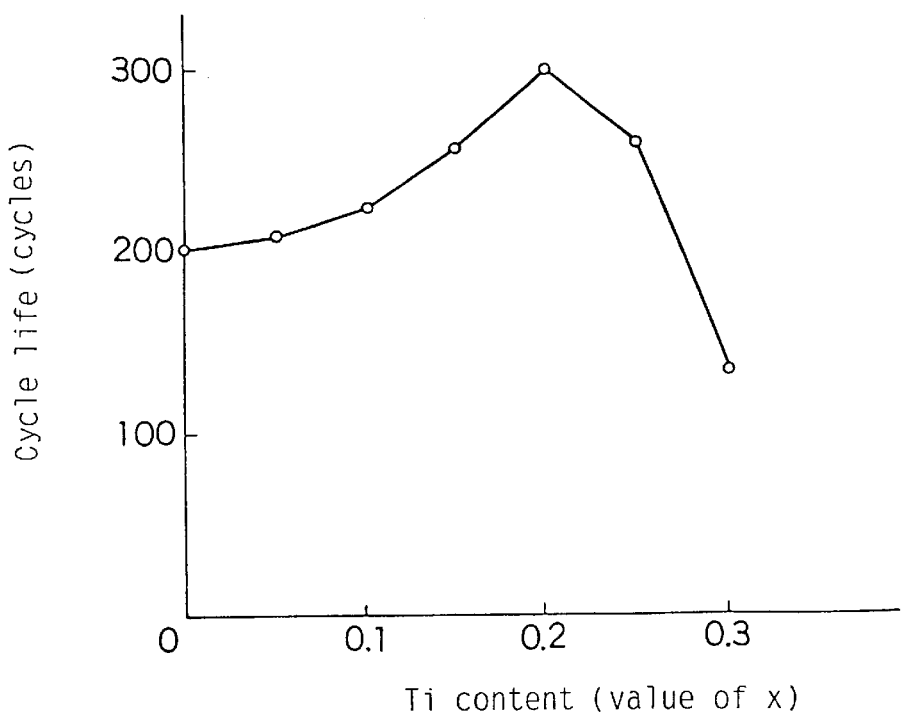
FIG. 7 is a characteristic diagram showing a relationship between the Ti content of the alloy and the cycle life.

First, the amount of Ti will be described. In the alloy composition represented by the formula $Zr_{1-x}Ti_xMn_{0.6}Mo_{0.1}Cr_{0.2}Co_{0.1}Ni_{1.15}$, the value "x" was varied in a range of 0 to 0.3. The results are shown in FIG. 7. A cycle life of not less than 250 cycles was obtained when the "x" value, that is, Ti content was in a range of 0.15 to 0.25.

Figure 8:
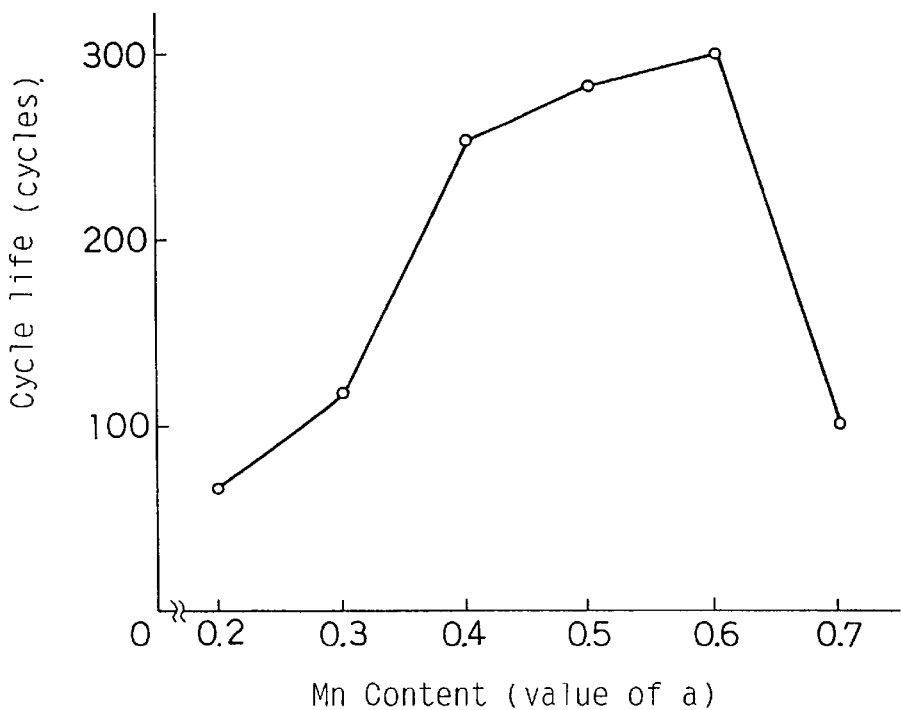
FIG. 8 is a characteristic diagram showing a relationship between the Mn content of the alloy and the cycle life.

Next, the Mn content will be investigated. In the alloy composition represented by the formula $Zr_{0.8}Ti_{0.2}Mn_aMo_{0.1}Cr_{0.2}Co_{0.1}Ni_{1.15}$, a result obtained by varying the value of "a" in a range of 0.2 to 0.7 is shown in FIG. 8. In the range of the value "a", i.e., the amount of Mn of 0.4 to 0.6, a cycle life of not less than 250 cycles is obtained.

Figure 9:
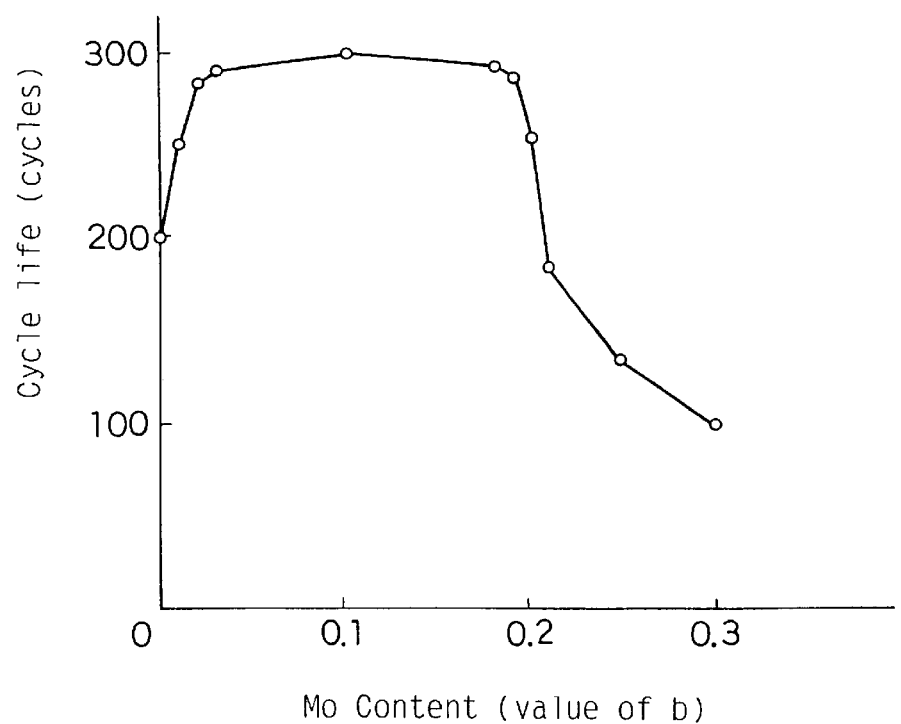
FIG. 9 is a characteristic diagram showing a relationship between the Mo content of the alloy and the cycle life.

The amount of Mo will be described. In the alloy composition represented by the formula $Zr_{0.8}Ti_{0.2}Mn_{0.6}Mo_bCr_{0.2}Co_{0.1}Ni_{1.15}$, a result obtained by varying the value of "b" in a range of 0 to 0.3 is shown in FIG. 9. In the range of the value "b", i.e., the amount of Mo of 0.01 to 0.2, a cycle life of not less than 250 cycles is obtained.

Figure 10:
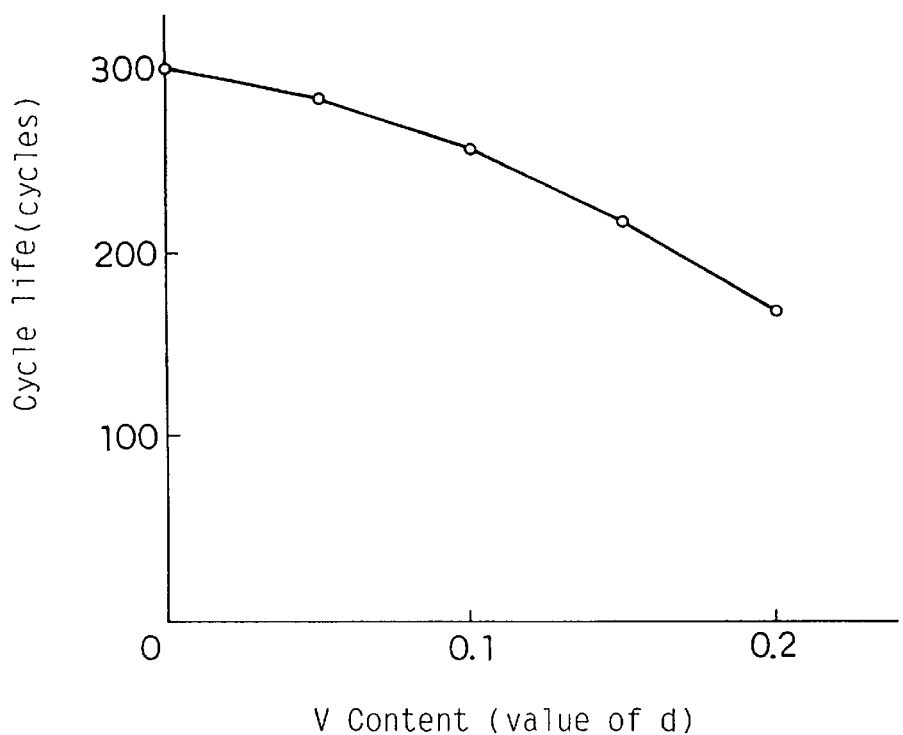
FIG. 10 is a characteristic diagram showing a relationship between the V content of the alloy and the cycle life.

The amount of V will be described. In the alloy composition represented by the formula $Zr_{0.8}Ti_{0.2}Mn_{0.6}Mo_{0.1}V_dCr_{0.2}Co_{0.1}Ni_{1.15}$, a result obtained by varying the value of "d" in a range of 0 to 0.2 is shown in FIG. 10. In the range of the value "d", i.e., the amount of V of 0 to 0.1, a cycle life of not less than 250 cycles is obtained.

Figure 11:
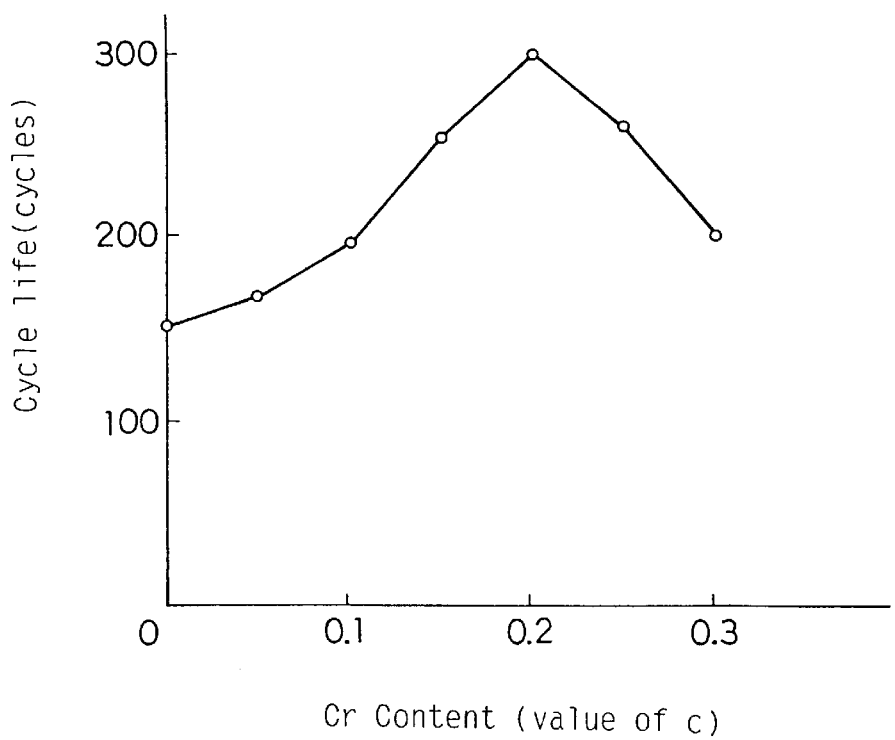
FIG. 11 is a characteristic diagram showing a relationship between the Cr content of the alloy and the cycle life.

The amount of Cr will be described. In the alloy composition represented by the formula $Zr_{0.8}Ti_{0.2}Mn_{0.6}Mo_{0.1}Cr_cCo_{0.1}Ni_{1.15}$, a result obtained by varying the value of "c" in a range of 0 to 0.3 is shown in FIG. 11. In the range of the value "c", i.e., the amount of Cr of 0.15 to 0.25, a cycle life of not less than 250 cycles is obtained.

Figure 12:
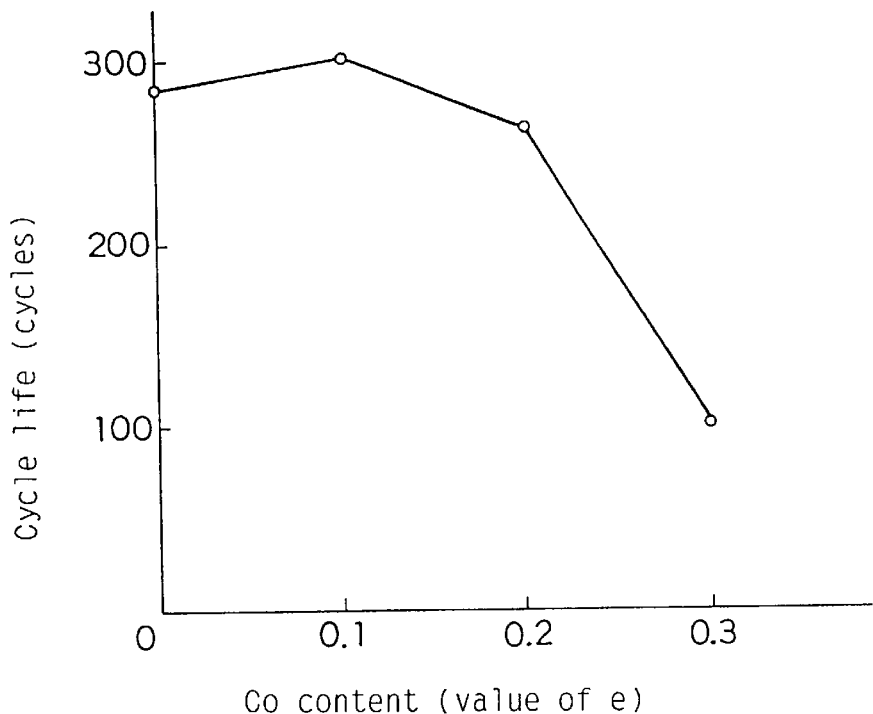
FIG. 12 is a characteristic diagram showing a relationship between the Co content of the alloy and the cycle life.

The amount of Co will be described. In the alloy composition represented by the formula $Zr_{0.8}Ti_{0.2}Mn_{0.6}Mo_{0.1}Cr_{0.2}Co_eNi_{1.15}$, a result obtained by varying the value of "e" in a range of 0 to 0.3 is shown in FIG. 12. In the range of the value "e", i.e., the amount of Co of 0 to 0.2, a cycle life of not less than 250 cycles is obtained.

Figure 13:
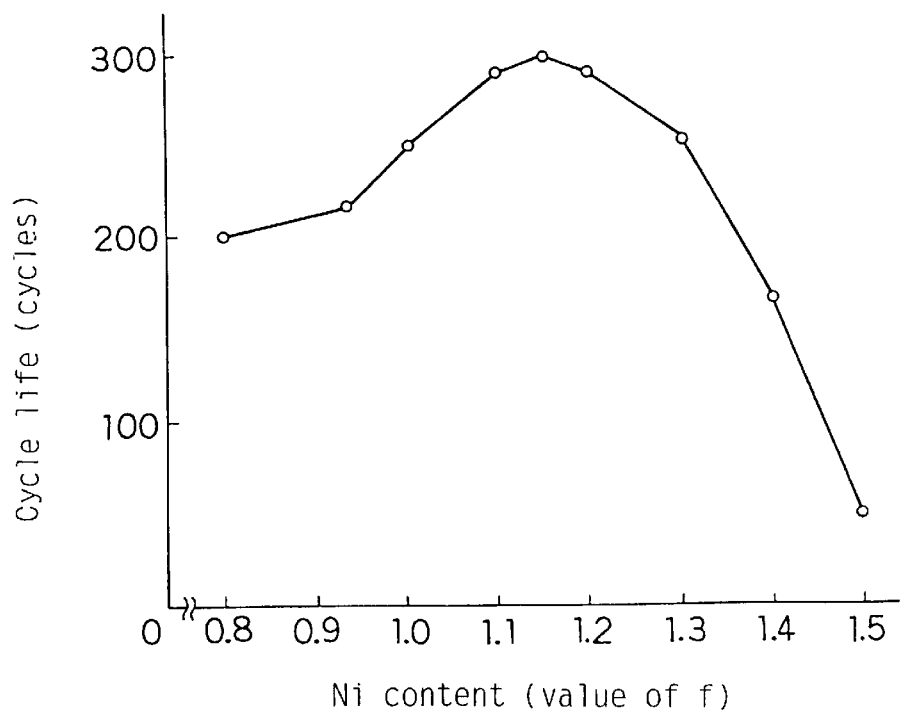
FIG. 13 is a characteristic diagram showing a relationship between the Ni content of the alloy and the cycle life.

The amount of Ni will be described. In the alloy composition represented by the formula $Zr_{0.8}Ti_{0.2}Mn_{0.6}Mo_{0.1}Cr_{0.2}Co_{0.1}Ni_f$, a result obtained by varying the value of "f" in a range of 0.8 to 1.5 is shown in FIG. 13. In the range of the value "f", i.e., the amount of Ni of 1.0 to 1.3, a cycle life of not less than 250 cycles is obtained.

The above results clarified that the alloy having a composition represented by the below-mentioned general formula is excellent:

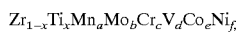

$Zr_{1-x}Ti_xMn_aMo_bCr_cV_dCo_eNi_f,$ where $0.15 \leq x \leq 0.25$, $0.4 \leq a \leq 0.6$, $0.01 \leq b \leq 0.2$, $0.15 \leq c \leq 0.25$, $0 \leq d \leq 0.1$, $0 \leq e \leq 0.2$, $1 \leq f \leq 1.3$.

It is also clarified in a separate experiment that some of the alloys having the above alloy composition cannot demonstrate an excellent cycle life characteristic, unless the alloy does fulfill the condition: $1.6 \leq (a+b+c+d+e+f) \leq 2$.

Based on another experiment, it is found that a higher hydrogen storage ability is obtained with the alloy if it is subjected to a homogenizing treatment. It is further appreciated that the condition of the treatment in a vacuum or in an inert gas atmosphere at 800 to 1200° C. is preferable.

The batteries were disassembled after the cycle life test, and the negative electrodes were analyzed as in Example 1. Back-scattered electron microscopic imaging revealed the presence of segregated phases in all the alloys having an inferior cycle life. In these alloys, the sum of the integrated intensities of the diffraction peaks due to the non-Laves phase in powder X-ray diffraction pattern was not less than 5% of the sum of the integrated intensities of all diffraction peaks. These findings clearly indicated impaired homogeneity of the structure of these alloys.

By contrast, no, or if present, only few segregated phases were observed in the alloys having a cycle life of not less than 250 cycles. Even in the alloys having only few segregated phases, the Laves phase having the crystal structure of the MgCu$_2$-type (C15) or the crystal structure of the MgZn$_2$-type (C14) was the main alloy phase. In a powder X-ray diffraction pattern, the sum of the integrated intensities of the diffraction peaks due to the non-Laves phase was not more than 5% of the sum of the integrated intensities of all diffraction peaks, which proved extremely high homogeneity of the alloy structure.

EXAMPLE 3

In the course of the present investigations, it became evident that it is also necessary to optimize the conditions of immersion of the alloy powder in an alkaline solution, in addition to the above-discussed optimization of the alloy structure and the amount of alloy components in order to further increase the effects of the alloy powder of the present invention. The details are described below.

In this example, the composition of the alloy, the procedures for preparing the alloy and the process for configuring the battery as well as the method for the evaluation similar to those for the battery A of the present invention were followed.

Figure 14:
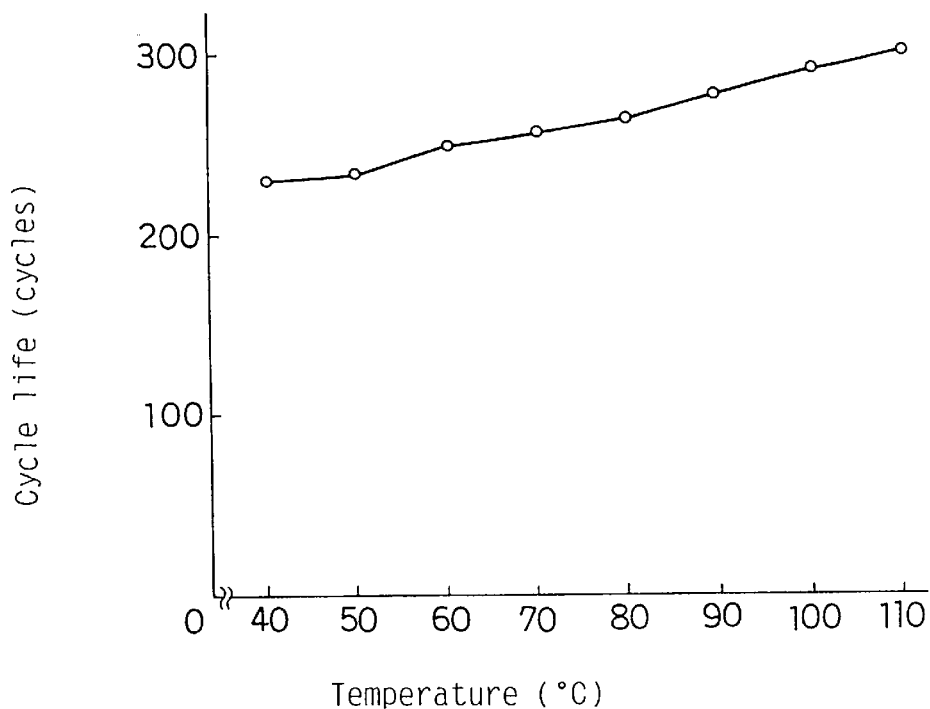
FIG. 14 is a characteristic diagram showing a relationship between the treatment temperature and the cycle life.

First, the temperature for the treatment will be described. The temperature of the treatment solution was varied in a range of 40 to 110° C. in the step of immersing the alloy powder in a treatment solution prepared by dissolving a saturated amount of cobalt hydroxide in a potassium hydroxide aqueous solution containing lithium hydroxide monohydrate at 40 g/L and having a specific gravity of 1.31. The treatment was performed for 6 hours. As shown in FIG. 14, a temperature of the solution of not lower than 60° C. yielded a cycle life as a battery of not less than 250 cycles.

Figure 15:
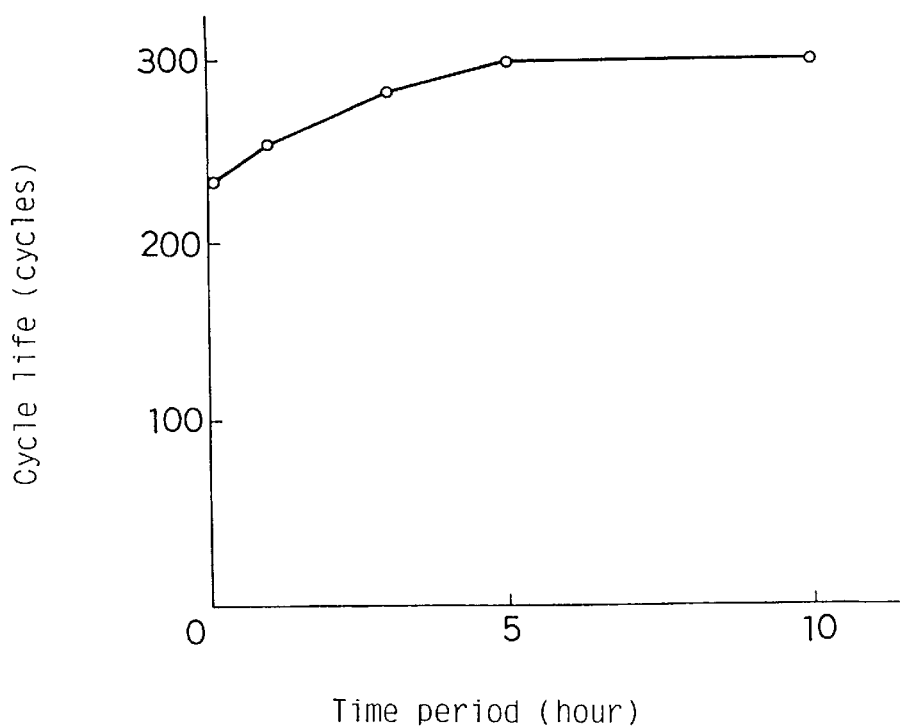
FIG. 15 is a characteristic diagram showing a relationship between the treatment time and the cycle life.

Next, the treatment time will be described. The time was varied in a range of 0.1 to 10 hours in the step of immersing the alloy powder in a treatment solution prepared in the same manner as described above. The treatment was performed at 110° C. As shown in FIG. 15, a time period of not less than 1 hour yielded a cycle life as a battery of not less than 250 cycles.

On the basis of the above results, it is clarified that it is preferable to perform the treatment step at a temperature of not lower than 60° C. for not less than 1 hour.

Based on another experiment, it is further clarified that a more excellent result is obtained if Co compound is dissolved in the treatment solution.

An analysis of the alloy powders used in this example revealed that all the hydrogen storage alloy powders that showed a cycle life as a battery of not less than 250 cycles have a specific surface area of not less than 2 $m^2/g$ or a magnetized value of not less than 0.5 emu/g in a magnetic field of 10 k Oe at 25° C. after immersing treatment. In contrast to this, each of the hydrogen storage alloy powders that demonstrate an inferior cycle life characteristic as a battery of not more than 250 cycles has a specific surface area of less than 2 $m^2/g$, and a magnetized value of less than 0.5 emu/g in a magnetic field of 10 k Oe at 25° C. Those alloys having a specific surface area of not less than 2 $m^2/g$ and a magnetized value of not less than 0.5 emu/g in a magnetic field of 10 k Oe at 25° C. demonstrate a particularly excellent cycle life characteristic.

EXAMPLE 4

As the hydrogen storage alloy, one represented by the formula $ZrMn_{0.5}Mo_{0.1}Cr_{0.1}Co_{0.1}Ni_{1.2}$ was selected. The alloy was prepared with metal raw materials each having a purity of not less than 99.9% and finished to a powder by the gas atomizing process. The amount of one batch was 4 kg. The obtained alloy was a spherical powder. The powder was heat-treated at 1000° C. for 6 hours in a vacuum, and sifted through a sieve to select particles having an average diameter of about 150 $\mu$m. An elementary analysis by ICP emission spectrometry on the obtained sample confirmed that it generally had an intended composition.

The alloy powder sample thus obtained was kneaded with water and carboxymethyl cellulose as a binding agent to produce a paste which was then filled in a foamed nickel porous substrate having a porosity of 95%. After the substrate was dried in a vacuum at 90° C. and pressed to a thickness of 0.33 mm, it was cut into a rectangular negative electrode having a width of 39 mm and a length of 97 mm.

As the positive electrode, a known foamed nickel electrode comprising an active material of nickel hydroxide and an additional Co compound for improving its utilization was selected and finished to a rectangular shape having a width of 39 mm, a length of 77 mm and a thickness of 0.70 mm which was then provided with a lead plate.

As a separator, a hydrophilic polypropylene nonwoven fabric was selected.

By rolling up a combination of the negative electrode, the positive electrode and the separator in a spiral fashion, the rolled up assembly was inserted into a cylindrical battery case of AA size. After injecting 2.2 ml of an electrolyte prepared by dissolving lithium hydroxide at 40 g/L in a potassium hydroxide aqueous solution having a specific gravity of 1.30 into the battery case, its open end was closed and a sealed battery was obtained. This was named battery C in accordance with the present invention.

For comparison, a conventional battery was also configured. A procedure similar to that for the already disclosed battery was followed except for the use of a hydrogen storage alloy of the formula $ZrMn_{0.6}V_{0.2}Cr_{0.1}Ni_{1.2}$ prepared by a high frequency induction melting-casting process with mechanical crushing and sieving. This was named conventional battery D.

The capacity of both batteries C and D at 5-hour discharge rate was about 1200 mAh, which substantially coincides with a theoretical capacity.

The batteries C and D were evaluated by a high rate discharge test at a low temperature. By using a battery precharged at 10-hour rate for 15 hours at room temperature, a discharge test was conducted at 1-hour rate until the terminal voltage dropped to 1.0 V at an ambient temperature of 0° C. The reason for selecting the 1-hour discharge rate and the ambient temperature of 0° C. is that a discharge characteristic of a battery is deteriorated more at a high rate discharge and at a low temperature than at a low rate discharge and at room temperature in general. This makes the result of evaluation more clear.

Figure 16:
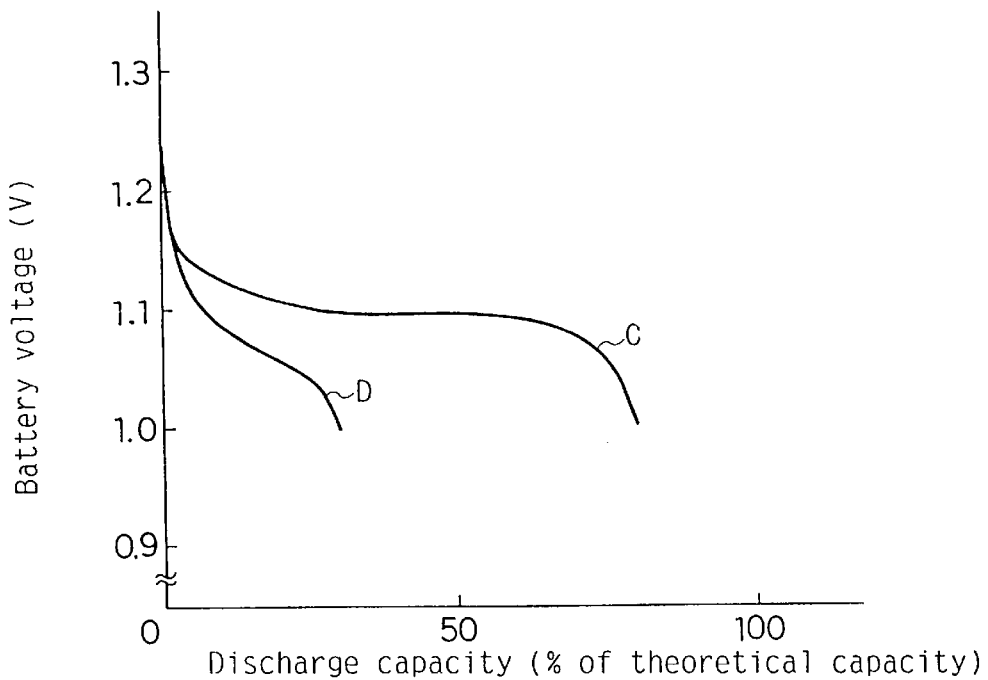
FIG. 16 is a diagram showing discharge curves at one-hour discharge rate at 0° C. of the battery C of the present invention and the conventional battery D.

In this discharge test, a proportion of the dischargeable capacity of the battery to the theoretical capacity (about 1200 mAh) is selected as an index of the low temperature/high rate discharge characteristic. The result is shown in FIG. 16.

The conventional battery D had a discharge capacity of about 30% of the theoretical capacity. Whereas, the battery C in accordance with the present invention demonstrated a discharge capacity of about 80% of the theoretical capacity.

Upon completion of the above-mentioned discharge test, the batteries were disassembled and the hydrogen storage alloy negative electrodes were analyzed by powder X-ray diffractometry. As a result, it was confirmed that in the battery C of the present invention, the main alloy phase of the hydrogen storage alloy was the Laves phase having the crystal structure of the $MgCu_2$-type (C15), and diffraction peaks attributed to the presence of segregated phases were not present. Back-scattered electron micrograph of a cross-section of the alloy powder revealed the absence of any segregated phase, and no diffraction peaks attributed to the presence of phases other than the main phase appeared in a powder X-ray diffraction pattern. These results clearly indicated that an alloy having a very highly homogeneous structure was obtained.

In the conventional battery D, on the other hand, although the main alloy phase was the Laves phase, diffraction peaks, probably due to the presence of the segregated phase, appeared in a powder X-ray diffraction pattern. The integrated intensities of diffraction peaks due to the non-Laves phase is about 10%. An existence of a structure, which was considered apparently to be composed of the segregated phase, was confirmed on a backscattered electron micrograph of the cross-section.

On the basis of the analytical results, it was believed that the battery C in accordance with the present invention has very high homogeneity of the alloy structure, a large proportion of the main alloy phase which contributes to the charge/discharge function of the battery, and a small crystal size, which lead to improved discharge characteristic.

EXAMPLE 5

An investigation was conducted on the preparative process of the hydrogen storage alloy and the shape of the alloy.

In this example, an alloy composition and a method for configuring the battery similar to those in the battery C in accordance with the present invention were adopted. In such a process that does not directly produce an alloy sample in a powder form, a mechanical crushing with sieving was performed.

For the evaluation of the obtained battery, the same low temperature/high rate discharge test as that in Example 4 was conducted. The results of the tests are shown in FIG. 17 through FIG. 20.

Figure 17:
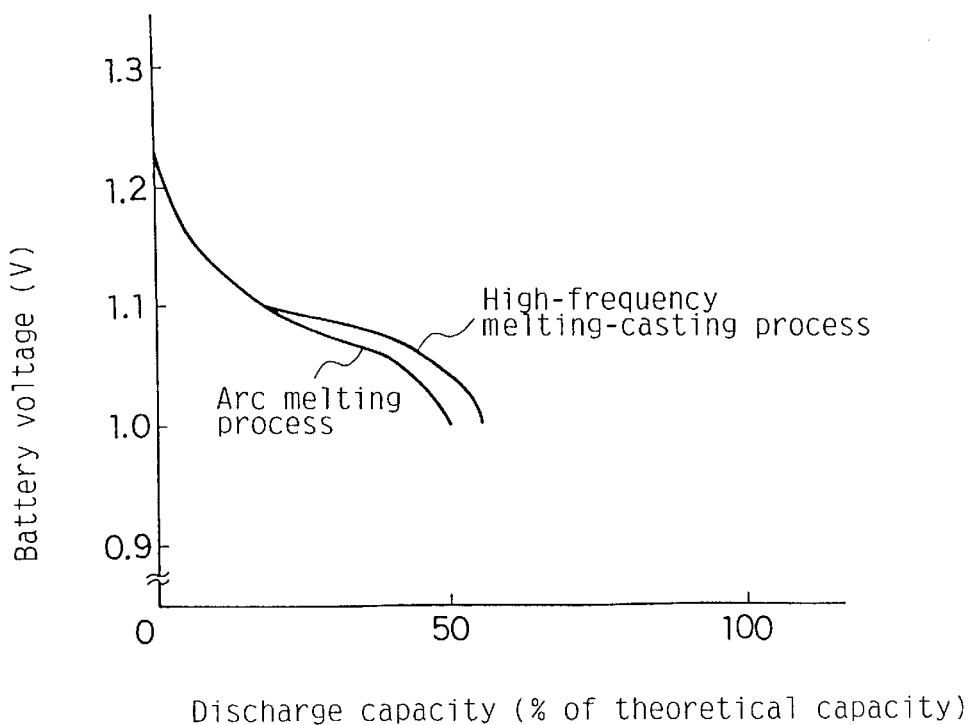
FIG. 17 is a diagram showing discharge curves at one-hour discharge rate at 0° C. of the batteries configured with the alloys produced by different preparative processes.

FIG. 17 shows a result of the test on the alloys prepared by the high-frequency induction melting-casting process and an arc melting process, respectively. In both alloys, the discharge capacity of not more than 60% of the theoretical value was obtained.

Figure 18:
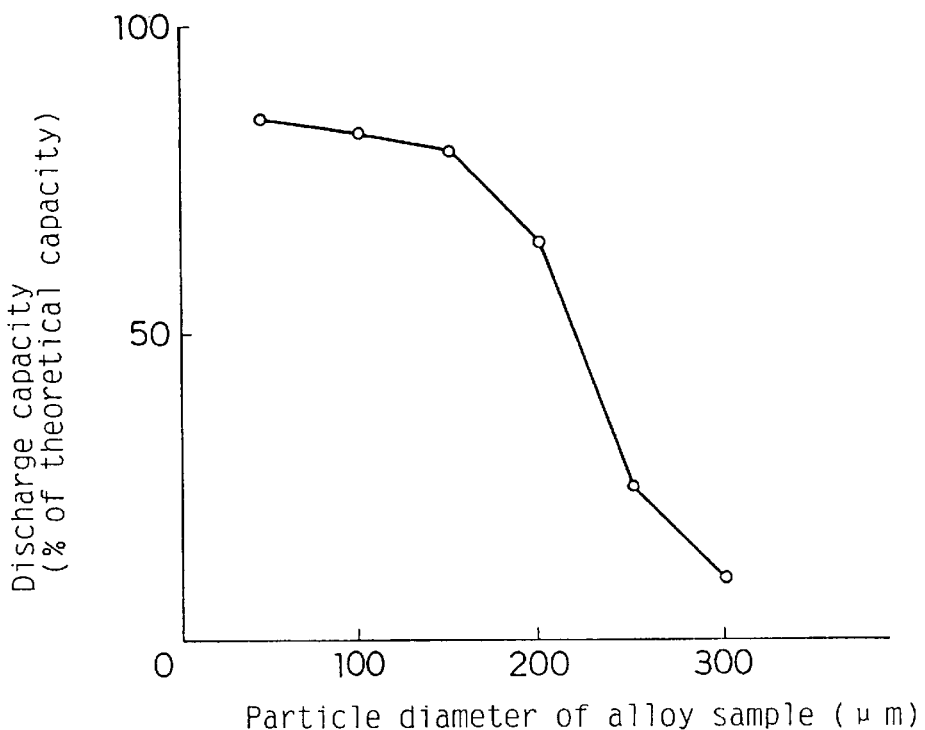
FIG. 18 is a diagram showing a relationship between the sample diameter and the discharge capacity at one-hour discharge rate at 0° C.

FIG. 18 shows a result of the test on the alloys prepared by an argon gas atomizing process in which the particle diameter of the alloy sample is varied. Each of the samples is a spherical powder. The smaller the particle diameter, the more excellent the discharge characteristic becomes. A discharge capacity of about 85% of the theoretical value is obtained with a particle diameter of 45 μm. In contrast, with a particle diameter of more than 200 μm, the discharge capacity is greatly deteriorated to not more than 60% of the theoretical value. It is therefore believed that in this preparative process, when the particle diameter is increased to more than 200 μm, the cooling rate of the particles is decreased and the homogeneity of the alloy structure is lost, thereby to deteriorate the discharge characteristic.

A similar result was obtained when nitrogen gas was used in place of argon gas, or water in place of any gas in the case of water atomizing process. It is clarified that the obtained discharge characteristic is dependent on the particle diameter of the alloy powder in each case.

Figure 19:
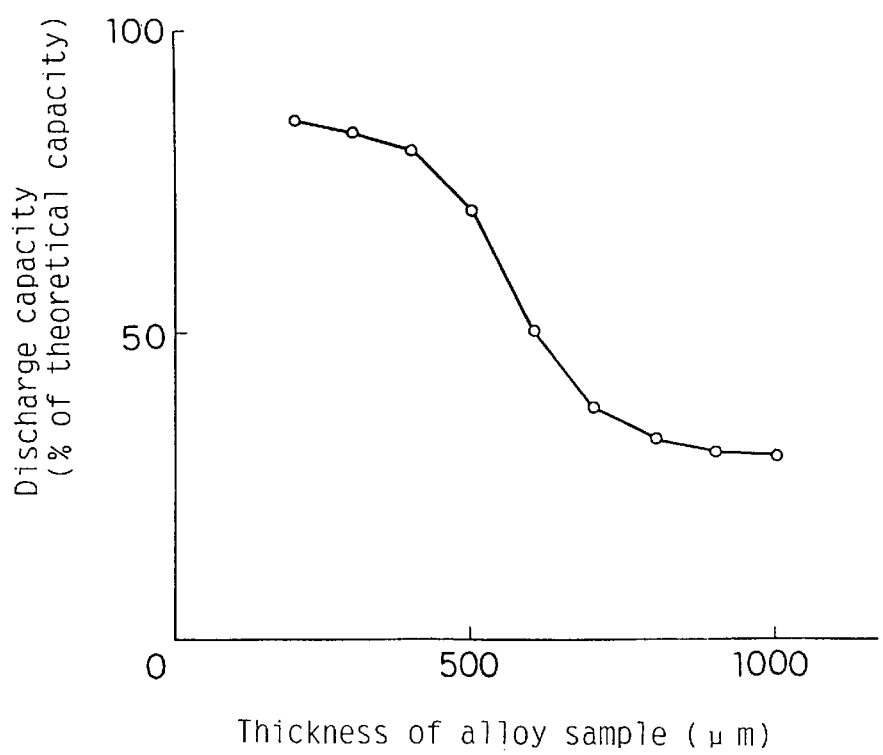
FIG. 19 is a diagram showing a relationship between the sample thickness and the discharge capacity at one-hour discharge rate at 0° C.

FIG. 19 shows a result of the test on the alloys prepared by a roll-rapid cooling process. As a system for the roll-rapid cooling process, a single roll system using only one copper roll was adopted. The obtained sample was a thin band-like form. The thinner the thickness of the thin band-like form, the better the discharge characteristic becomes. If the thickness was more than 500 μm, the discharge characteristic was deteriorated and the discharge capacity was not more than 60% of the theoretical capacity. In this roll-rapid cooling process, the use of a twine roll system employing two rolls does not cause any significant difference, and an excellent discharge characteristic is obtained if the thickness of the sample is not more than 500 μm.

Figure 20:
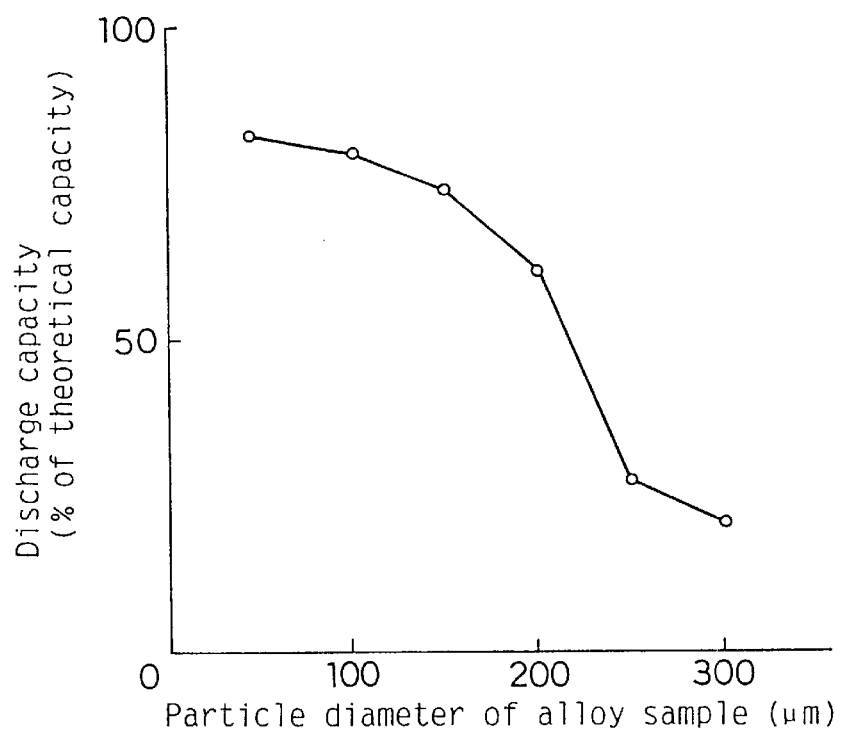
FIG. 20 is a diagram showing a relationship between the sample diameter and the discharge capacity at one-hour discharge rate at 0° C.

FIG. 20 shows a result on the alloys prepared by a centrifugal spraying process. The obtained powder sample has an indefinite shape. The smaller the particle diameter of the powder, the more preferable the discharge characteristic becomes. When the particle diameter is larger than 200 μm, the discharge capacity is greatly deteriorated to not more than 60% of the theoretical value.

On the basis of the above-mentioned results, it is clarified that there is a high correlation between the discharge characteristic of the battery, the preparative method of the alloy and the shape of the obtained sample. It is therefore concluded that it is preferable to produce a hydrogen storage alloy of a spherical powder or a powder en bloc having a particle diameter of not more than 200 μm, or a thin flake powder or thin band-like having a thickness of not more than 500 μm, by an ultra-rapid cooling solidifying process selected from gas atomizing process, water atomizing process, roll rapid cooling process and centrifugal spraying process.

An analysis on the hydrogen storage alloy negative electrodes conducted by disassembling the batteries evaluated in the above confirmed that there is a segregated phase on a back-scattered electron image in each of the alloys having an inferior discharge characteristic in which the sum of the integrated intensities of the diffraction peaks due to the non-Laves phase is not less than 5% of the sum of the integrated intensities of all diffraction peaks in a powder X-ray diffraction pattern, and the homogeneity of the alloy structure is greatly deteriorated.

In contrast, it is confirmed that in the hydrogen storage alloy which demonstrates a discharge capacity of not less than 60%, virtually no segregated phase is present, or even if some present the Laves phase is its main alloy phase, and that the sum of the integrated intensities of the diffraction peaks due to the non-Laves phase is not more than 5% of the sum of the integrated intensities of all diffraction peaks in a powder X-ray diffraction pattern, and the homogeneity of the alloy structure is extremely high.

EXAMPLE 6

It is clarified that in order to further demonstrate the technical advantage of the present invention, in addition to the above-discussed alloy structure, the amounts of alloy components should be optimized. In the following paragraphs, how to optimize will be described in detail.

In this example, an investigation was made on the alloy composition. Procedures similar to those for the battery C in accordance with the present invention were followed in the preparation of the alloy, the method for configuring the battery and the method for evaluation.

Figure 21:
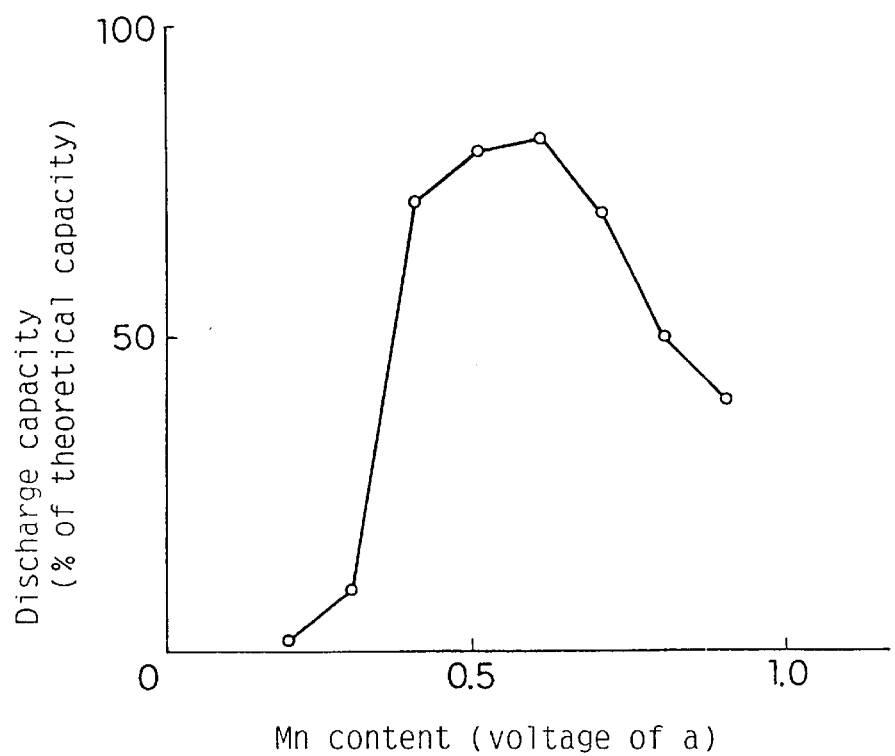
FIG. 21 is a diagram showing a relationship between the Mn content of the alloy and the discharge capacity at one-hour discharge rate at 0° C.

First, the Mn content will be examined. In the alloy composition represented by the formula $ZrMn_aMo_{0.1}Cr_{0.1}Co_{0.1}Ni_{1.2}$, a result obtained by varying the value of "a" in a range of 0.2 to 0.9 is shown in FIG. 21. In the range of the value "a", i.e., the Mn content of 0.4 to 0.7, a discharge capacity of not less than 60% is obtained.

Figure 22:
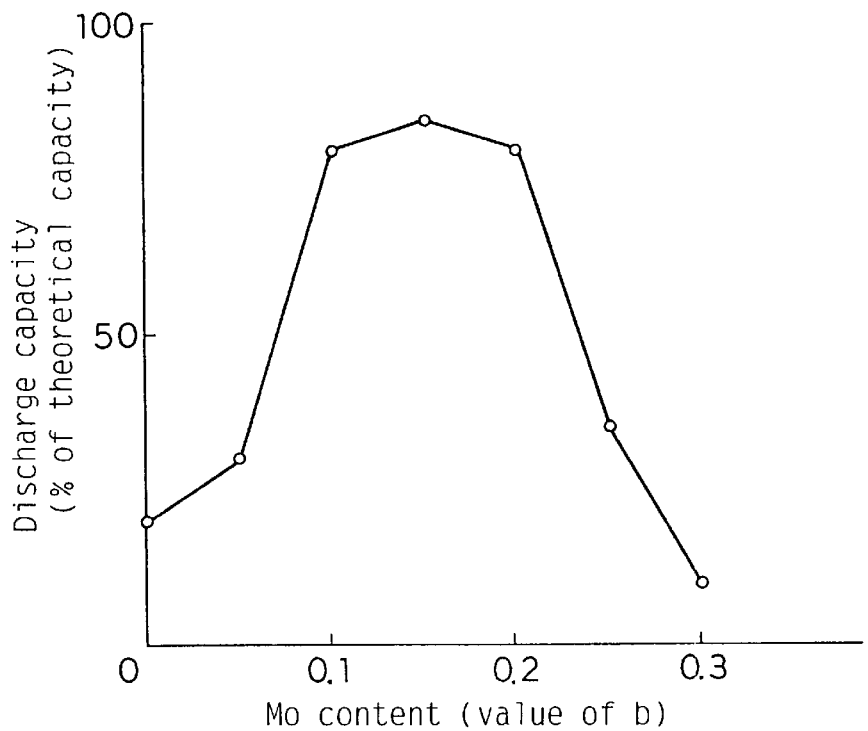
FIG. 22 is a diagram showing a relationship between the Mo content of the alloy and the discharge capacity at one-hour discharge rate at 0° C.

Then, the amount of Mo will be described. In the alloy composition represented by the formula $ZrMn_{0.5}Mo_bCr_{0.1}Co_{0.1}Ni_{1.2}$, a result obtained by varying the value of "b" in a range of 0 to 0.3 is shown in FIG. 22. In the range of the value "b", i.e., the Mo content of 0.1 to 0.2, a discharge capacity of not less than 60% is obtained.

Figure 23:
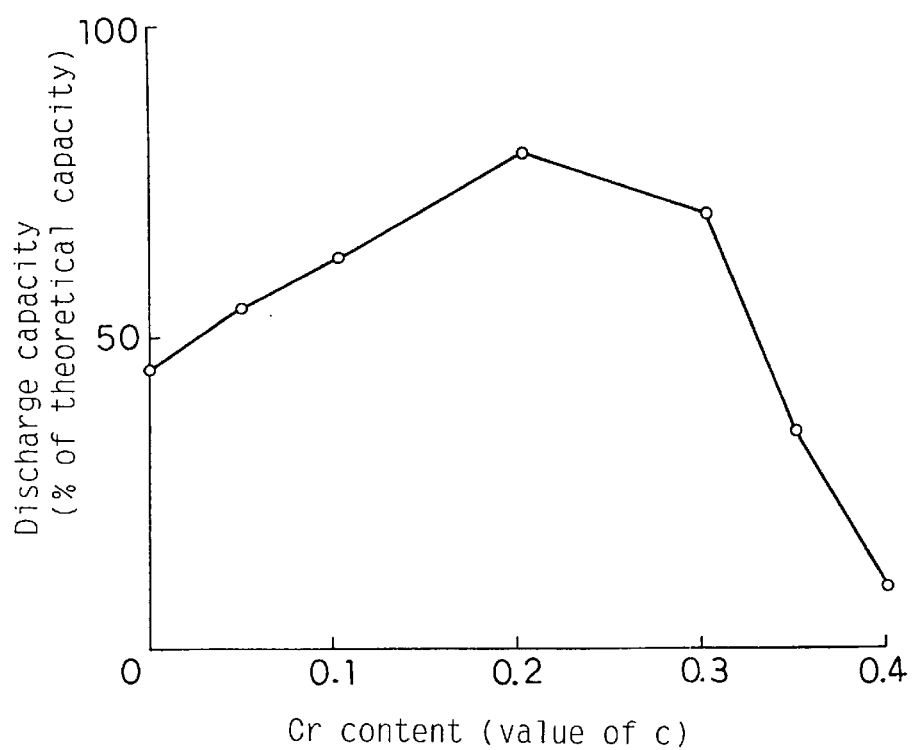
FIG. 23 is a diagram showing a relationship between the Cr content of the alloy and the discharge capacity at one-hour discharge rate at 0° C.

The amount of Cr will be described. In the alloy composition represented by the formula $ZrMn_{0.5}Mo_{0.1}Cr_cCo_{0.1}Ni_{1.2}$, a result obtained by varying the value of "c" in a range of 0 to 0.4 is shown in FIG. 23. In the range of the value "c", i.e., the Cr content of 0.1 to 0.3, a discharge capacity of not less than 60% is obtained.

Figure 24:
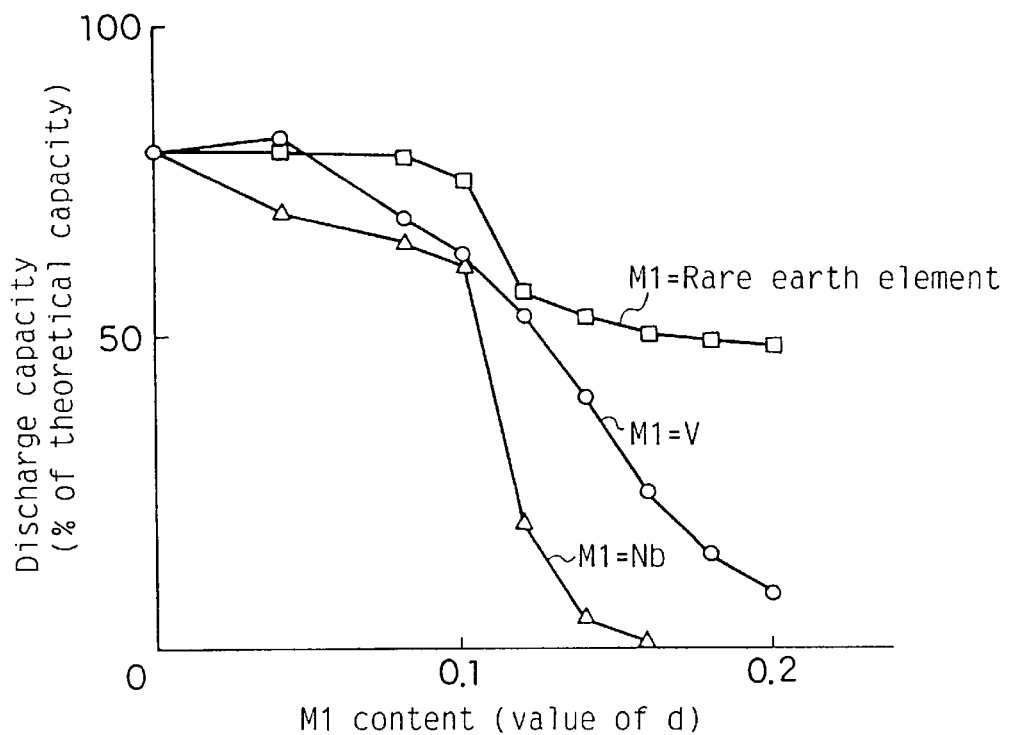
FIG. 24 is a diagram showing a relationship between the M1 content of the alloy and the discharge capacity at one-hour discharge rate at 0° C.

The amount of M1 (M1 is at least one element selected from the group consisting of V, Nb and rare earth elements) will be described. In the alloy composition represented by the formula $ZrMn_{0.5}Mo_{0.1}Cr_{0.1}M1_dCo_{0.1}Ni_{1.2}$, a result obtained by varying the value of "d" in a range of 0 to 0.2 is shown in FIG. 24. In any cases where M1 is one of V, Nb and rare earth elements, in the range of the value d, i.e., the M1 content of 0 to 0.1, a discharge capacity of not less than 60% is obtained. A similar result is obtained when M1 is a mixture of V, Nb and rare earth elements.

Figure 25:
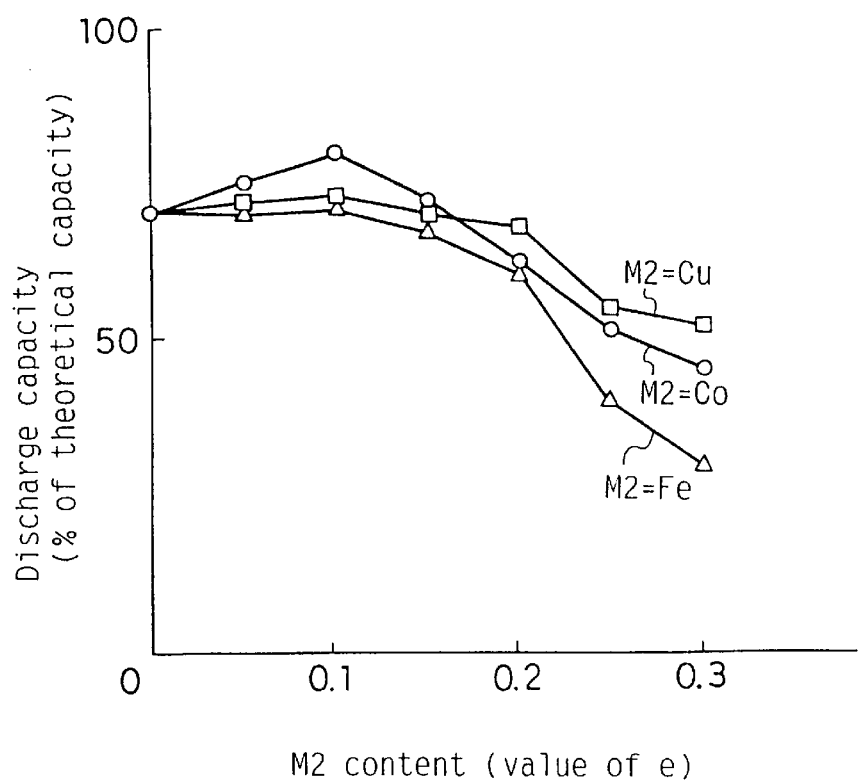
FIG. 25 is a diagram showing a relationship between the M2 content of the alloy and the discharge capacity at one-hour discharge rate at 0° C.

Next, the amount of M2 (M2 is at least one element selected from the group consisting of Fe, Co and Cu) will be described. In the alloy composition represented by the formula $ZrMn_{0.5}Mo_{0.1}Cr_{0.1}M2_eNi_{1.2}$, a result obtained by varying the value of "e" in a range of 0 to 0.3 is shown in FIG. 25. In any cases where M2 is one of Fe, Co and Cu, in the range of the value "e", i.e., the M2 content of 0 to 0.2, a discharge capacity of not less than 60% is obtained. A similar result is obtained when M2 is a mixture of Fe, Co and Cu.

Figure 26:
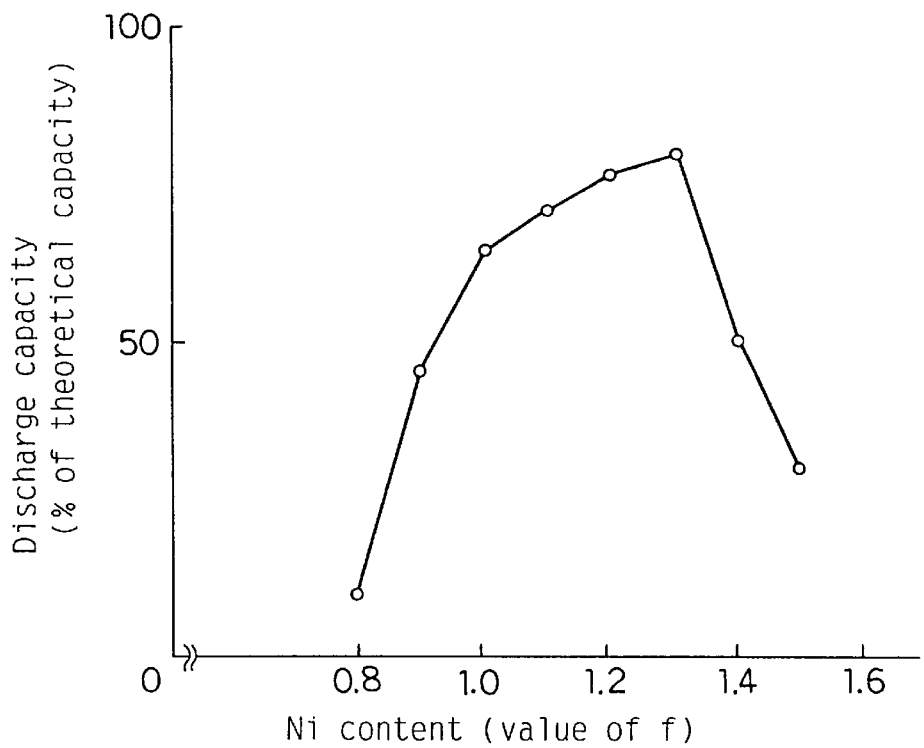
FIG. 26 is a diagram showing a relationship between the Ni content of the alloy and the discharge capacity at one-hour discharge rate at 0° C.

The amount of Ni will be described. In the alloy composition represented by the formula $ZrMn_{0.5}Mo_{0.1}Cr_{0.1}Co_{0.1}Ni_f$, a result obtained by varying the value of "f" in a range of 0.8 to 1.5 is shown in FIG. 26. In the range of the value "f", i.e., the Ni content of 1.0 to 1.3, a discharge capacity of not less than 60% is obtained.

On the basis of the above results, it is clarified that the alloy having a composition represented by the below-mentioned general formula is excellent:

$$ZrMn_aMo_bCr_cM1_dM2_eNi_f$$

where, M1 represents at least one element selected from the group consisting of V, Nb and rare earth elements, and M2 represents at least one element selected from the group consisting of Fe, Co and Cu, and where $0.4 \leq a \leq 0.7$, $0.1 \leq b \leq 0.2$, $0.1 \leq c \leq 0.3$, $0 \leq d$ 0.1, $0 \leq e \leq 0.2$, $1.0 \leq f \leq 1.3$.

Figure 27:
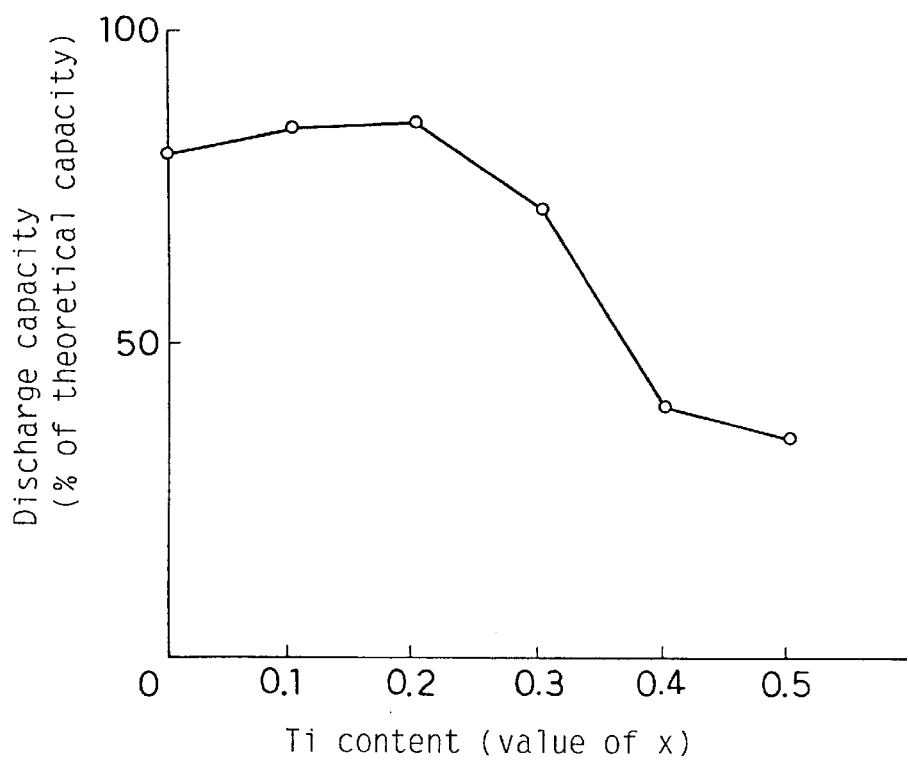
FIG. 27 is a diagram showing a relationship between the Ti content of the alloy and the discharge capacity at one-hour discharge rate at 0° C.
Figure 28:
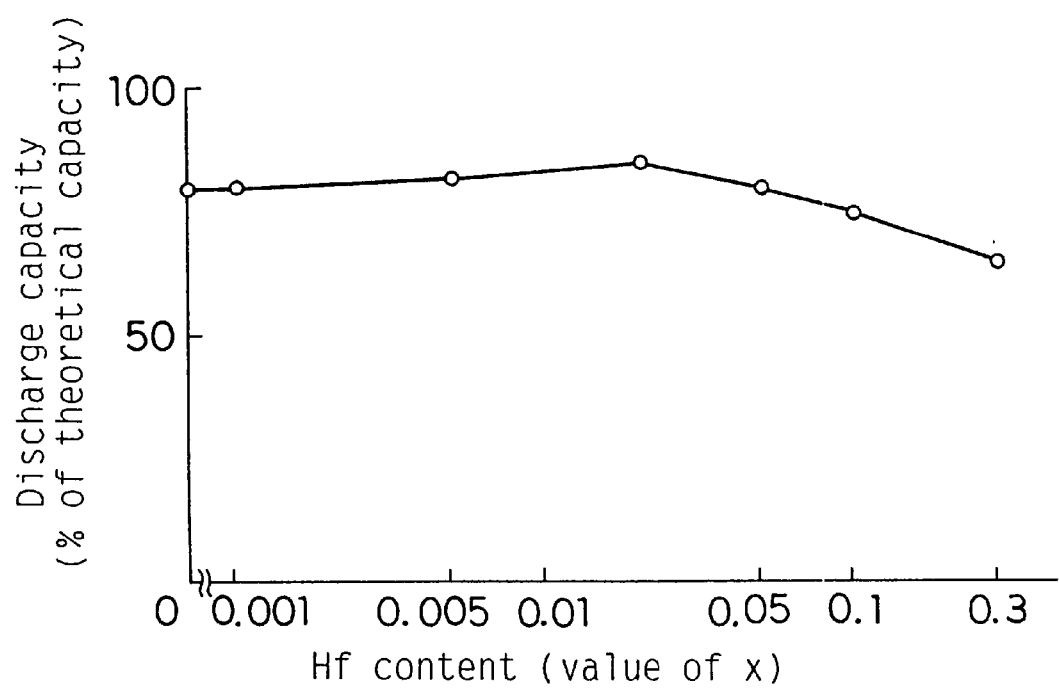
FIG. 28 is a diagram showing a relationship between the Hf content of the alloy and the discharge capacity at one-hour discharge rate at 0° C.

Next, the amount of M3 (M3 is at least one element selected from the group consisting of Ti and Hf) will be described. In the alloy composition represented by the formula $Zr_{1-x}M3_xMn_{0.5}Mo_{0.1}Cr_{0.1}Co_{0.1}Ni_{1.2}$, a result obtained by varying the value of "x" in a range of 0 to 0.5 is shown in FIG. 27. When M3 is Ti, in the range of the value "x", i.e., the Ti content of 0 to 0.3, a discharge capacity of not less than 60% is obtained. Or, when M3 is Hf in the alloy composition represented by the formula $Zr_{1-x}M3_xMn_{0.5}Mo_{0.1}Cr_{0.1}Co_{0.1}Ni_{1.2}$, a result obtained by varying the value of "x" in a range of 0 to 0.3 is shown in FIG. 28. In the range of the value "x", i.e., the Hf content of 0.003 to 0.1, a particularly excellent discharge capacity of not less than 70% is obtained. Or, when M3 is a mixture of Ti and Hf, in a range of the value "x" of 0 to 0.3, a discharge capacity of not less than 60% is obtained.

It is clarified that by optimizing the content of the elements other than M3 for constituting the alloy composition containing M3, the alloy represented by the below-mentioned general formula is excellent:

$$Zr_{1-x}M3_xMn_aMo_bCr_cM1_dM2_eNi_f$$

where, M1 represents at least one element selected from the group consisting of V, Nb and rare earth elements, M2 represents at least one element selected from the group consisting of Fe, Co and Cu, and M3 represents at least one element selected from the group consisting of Ti and Hf, and where $0 \leq x \leq 0.3$, $0.3 \leq a \leq 0.7$, $0.01 \leq 0.2$, $0.05 \leq c \leq 0.3$, $0 \leq d \leq 0.1$, $0 \leq e \leq 0.2$, $0.8 \leq f \leq 1.3$.

From the results of another experiment, it was clarified that some of the alloys having the above alloy composition cannot demonstrate an excellent cycle life characteristic unless the alloy does fulfill the conditions: $1.8 \leq a+b+c+d+e+f \leq 2.2$ in the absence of M3 and $1.6 \leq a+b+c+d+e+f \leq 2.2$ in the presence of M3.

It is understood that various other modifications will be apparent to and can be readily made by those skilled in the art to which the present invention pertains without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

We claim:

1. A nickel-metal hydride storage battery comprising:
a positive electrode which comprises nickel hydroxide,
a negative electrode which comprises a hydrogen storage alloy powder capable of electrochemically absorbing and desorbing hydrogen in a reversible manner,
a separator interposed between said positive electrode and said negative electrode, and
an alkaline electrolyte,
wherein said hydrogen storage alloy is an intermetallic compound having a composition represented by the general formula $Zr_{1-x}M^3_xMn_aMo_bCr_cM^1_dM^2_eNi_f$, where $M^1$ represents at least one element selected from the group consisting of V, Nb and rare earth elements, $M^2$ represents at least one element selected from the group consisting of Fe, Co and Cu, and $M^3$ represents at least one element selected from the group consisting of Ti and Hf, and where $0 \leq x \leq 0.3$, $0.3 \leq a \leq 0.7$, $0.01 \leq b \leq 0.2$, $0.05 \leq c \leq 0.3$, $0 < d \leq 0.1$, $0 \leq e \leq 0.2$, $0.8 \leq f \leq 1.3$, and $1.6 \leq a+b+c+d+e+f \leq 2.2$, and
wherein said hydrogen storage alloy has at least one of a Laves phase having a crystal structure of the $MgCu_2$-type (C15) and a Laves phase having a crystal structure of the $MgZn_2$-type (C14), and wherein a sum of integrated intensities of diffraction peaks other than those attributed to the presence of said Laves phase is not more than 5% of a sum of integrated intensities of all diffraction peaks in a diffraction angle 2θ of 10° to 80° in a powder X-ray diffraction pattern by Cu Kα radiation.

2. A nickel-metal hydride storage battery comprising:
a positive electrode which comprises nickel hydroxide,
a negative electrode which comprises a hydrogen storage alloy powder capable of electrochemically absorbing and desorbing hydrogen in a reversible manner,
a separator interposed between said positive electrode and said negative electrode, and
an alkaline electrolyte,
wherein said hydrogen storage alloy is an intermetallic compound having a composition represented by the general formula $Zr_{1-x}Ti_xMn_aMo_bCr_cV_dCo_eNi_f$, where $0.15 \leq x \leq 0.25$, $0.4 \leq a \leq 0.6$, $0.01 \leq b \leq 0.2$, $0.15 \leq c \leq 0.25$, $0 < d \leq 0.1$, $0 \leq e \leq 0.2$, $1 \leq f \leq 1.3$, and $1.6 \leq (a+b+c+d+e+f) \leq 2$, and
wherein said hydrogen storage alloy has at least one of a Laves phase having a crystal structure of the $MgCu_2$-type (C15) and a Laves phase having a crystal structure of the $MgZn_2$-type (C14), and wherein a sum of integrated intensities of diffraction peaks other than those attributed to the presence of said Laves phase is not more than 5% of a sum of integrated intensities of all diffraction peaks in a diffraction angle 2θ of 10° to 80° in a powder X-ray diffraction pattern by Cu Kα radiation.

3. A nickel-metal hydride storage battery comprising:
a positive electrode which comprises nickel hydroxide,
a negative electrode which comprises a hydrogen storage alloy powder capable of electrochemically absorbing and desorbing hydrogen in a reversible manner,
a separator interposed between said positive electrode and said negative electrode, and
an alkaline electrolyte,
wherein said hydrogen storage alloy is an intermetallic compound having a composition represented by the general formula $ZrMn_aMo_bCr_cM^1_dM^2_eNi_f$, where $M^1$ represents at least one element selected from the group consisting of V, Nb and rare earth elements, and $M^2$ represents at least one element selected from the group consisting of Fe, Co and Cu, and where $0.4 \leq a \leq 0.7$, $0.1 \leq b \leq 0.2$, $0.1 \leq c \leq 0.3$, $0 < d \leq 0.1$, $0 \leq e \leq 0.2$, $1.0 \leq f \leq 1.3$, and $1.8 \leq a+b+c+d+e+f \leq 2.2$, and
wherein said hydrogen storage alloy has at least one of a Laves phase having a crystal structure of the $MgCu_2$-type (C15) and a Laves phase having a crystal structure of the $MgZn_2$-type (C14), and wherein a sum of integrated intensities of diffraction peaks other than those attributed to the presence of said Laves phase is not more than 5% of a sum of integrated intensities of all diffraction peaks in a diffraction angle 2θ of 10° to 80° in a powder X-ray diffraction pattern by Cu Kα radiation.

4. The nickel-metal hydride storage battery in accordance with claim 1, wherein said hydrogen storage alloy powder has been subjected to a treatment which includes immersing said hydrogen storage alloy powder in an alkaline aqueous solution containing at least lithium hydroxide and having a specific gravity of not less than 1.2, and has a specific surface area of not less than 2 m$^2$/g.

5. The nickel-metal hydride storage battery in accordance with claim 2, wherein said hydrogen storage alloy powder has been subjected to a treatment which includes immersing said hydrogen storage alloy powder in an alkaline aqueous solution containing at least lithium hydroxide and having a specific gravity of not less than 1.2, and has a specific surface area of not less than 2 m$^2$/g.

6. The nickel-metal hydride storage battery in accordance with claim 3, wherein said hydrogen storage alloy powder has been subjected to a treatment which includes immersing said hydrogen storage alloy powder in an alkaline aqueous solution containing at least lithium hydroxide and having a specific gravity of not less than 1.2, and has a specific surface area of not less than 2 m$^2$/g.

7. The nickel-metal hydride storage battery in accordance with claim 1, wherein said hydrogen storage alloy powder has been subjected to a treatment which includes immersing said hydrogen storage alloy powder in an alkaline aqueous solution containing at least lithium hydroxide and having a specific gravity of not less than 1.2, and has a magnetized value of not less than 0.5 emu/g and not more than 5 emu/g at 25° C. in a magnetic field of 10 k Oe.

8. The nickel-metal hydride storage battery in accordance with claim 2, wherein said hydrogen storage alloy powder has been subjected to a treatment which includes immersing said hydrogen storage alloy powder in an alkaline aqueous solution containing at least lithium hydroxide and having a specific gravity of not less than 1.2, and has a magnetized value of not less than 0.5 emu/g and not more than 5 emu/g at 25° C. in a magnetic field of 10 k Oe.

9. The nickel-metal hydride storage battery in accordance with claim 3, wherein said hydrogen storage alloy powder has been subjected to a treatment which includes immersing said hydrogen storage alloy powder in an alkaline aqueous solution containing at least lithium hydroxide and having a specific gravity of not less than 1.2, and has a magnetized value of not less than 0.5 emu/g and not more than 5 emu/g at 25° C. in a magnetic field of 10 k Oe.

10. The nickel-metal hydride storage battery in accordance with claim 1, wherein said hydrogen storage alloy powder has been subjected to a treatment comprising exposure to 800° C. to 1200° C. in a vacuum or an inert gas atmosphere.

11. The nickel-metal hydride storage battery in accordance with claim 2, wherein said hydrogen storage alloy powder has been subjected to a treatment comprising exposure to 800° C. to 1200° C. in a vacuum or an inert gas atmosphere.

12. The nickel-metal hydride storage battery in accordance with claim 3, wherein said hydrogen storage alloy powder has been subjected to a treatment comprising exposure to 800° C. to 1200° C. in a vacuum or an inert gas atmosphere.

13. A hydrogen storage alloy for a battery which comprises an intermetallic compound having a composition represented by the general formula $Zr_{1-x}M^3{}_xMn_aMo_bCr_cM^1{}_dM^2{}_eNi_f$, where $M^1$ represents at least one element selected from the group consisting of V, Nb and rare earth elements, $M^2$ represents at least one element selected from the group consisting of Fe, Co and Cu, and $M^3$ represents at least one element selected from the group consisting of Ti and Hf, and where $0 \leq x \leq 0.3$, $0.3 \leq a \leq 0.7$, $0.01 \leq b \leq 0.2$, $0.05 \leq c \leq 0 < d \leq 0.1$, $0 \leq e \leq 0.2$, $0.8 \leq f \leq 1.3$, and $1.6 \leq a+b+c+d+e+f \leq 2.2$, and wherein said hydrogen storage alloy has at least one of a Laves phase having a crystal structure of the $MgCu_2$-type (C15) and a Laves phase having a crystal structure of the $MgZn_2$-type (C14), and wherein a sum of integrated intensities of diffraction peaks other than those attributed to the presence of said Laves phase is not more than 5% of a sum of integrated intensities of all diffraction peaks in a diffraction angle 2θ of 10° to 80° in a powder X-ray diffraction pattern by Cu Kα radiation.

14. A hydrogen storage alloy for a battery which comprises an intermetallic compound having a composition represented by the general formula $Zr_{1-x}Ti_xMn_aMo_bCr_cV_dCo_eNi_f$, where $0.15 \leq x \leq 0.25$, $0.4 \leq a \leq 0.6$, $0.01 \leq b \leq 0.2$, $0.15 \leq c \leq 0.25$, $0 < d \leq 0.1$, $0 \leq e \leq 0.2$, $1 \leq f \leq 1.3$, and $1.6 \leq (a+b+c+d+e+f) \leq 2$, and wherein said hydrogen storage alloy has at least one of a Laves phase having a crystal structure of the $MgCu_2$-type (C15) and a Laves phase having a crystal structure of the $MgZn_2$-type (C14), and wherein a sum of integrated intensities of diffraction peaks other than those attributed to the presence of said Laves phase is not more than 5% of a sum of integrated intensities of all diffraction peaks in a diffraction angle 2θ of 10° to 80° in a powder X-ray diffraction pattern by Cu Kα radiation.

15. A hydrogen storage alloy for a battery which comprises an intermetallic compound having a composition represented by the general formula $ZrMn_aMo_bCr_cM^1{}_dM^2{}_eNi_f$, where $M^1$ represents at least one element selected from the group consisting of V, Nb and rare earth elements, and $M^2$ represents at least one element selected from the group consisting of Fe, Co and Cu, and where $0.4 \leq a \leq 0.7$, $0.1 \leq b \leq 0.2$, $0.1 \leq c \leq 0.3$, $0 < d \leq 0.1$, $0 \leq e \leq 0.2$, $1.0 \leq f \leq 1.3$, and $1.8 \leq a+b+c+d+e+f \leq 2.2$, and wherein said hydrogen storage alloy has at least one of a Laves phase having a crystal structure of the $MgCu_2$-type (C15) and a Laves phase having a crystal structure of the $MgZn_2$-type (C14), and wherein a sum of integrated intensities of diffraction peaks other than those attributed to the presence of said Laves phase is not more than 5% of a sum of integrated intensities of all diffraction peaks in a diffraction angle 2θ of 10° to 80° in a powder X-ray diffraction pattern by Cu Kα radiation.

16. The hydrogen storage alloy for a battery in accordance with claim 13, wherein said hydrogen storage alloy powder has been finished to a sphere or mass having a diameter of not more than 200 μm, or a thin flake or thin band-like form having a thickness of not more than 500 μm by an ultra-rapid cooling-solidifying process selected from the group consisting of gas atomizing process, water atomizing process, roll rapid cooling process and centrifugal spraying process.

17. The hydrogen storage alloy for a battery in accordance with claim 14, wherein said hydrogen storage alloy powder has been finished to sphere or mass having a diameter of not more than 200 μm, or a thin flake or thin band-like form having a thickness of not more than 500 μm by an ultra-rapid cooling-solidifying process selected from the group consisting of gas atomizing process, water atomizing process, roll rapid cooling process and centrifugal spraying process.

18. The hydrogen storage alloy for a battery in accordance with claim 15, wherein said hydrogen storage alloy powder has been finished to sphere or mass having a diameter of not more than 200 μm, or a thin flake or thin band-like form having a thickness of not more than 500 μm by an ultra-rapid cooling-solidifying process selected from the group consisting of gas atomizing process, water atomizing process, roll rapid cooling process and centrifugal spraying process.

19. The hydrogen storage alloy for a battery in accordance with claim 13, wherein a proportion of the Hf content to a sum of the Hf content and the Zr content is 0.003 to 0.1 by atomic ratio.

* * * * *